US011156116B2

(12) United States Patent
Kamrath et al.

(10) Patent No.: US 11,156,116 B2
(45) Date of Patent: Oct. 26, 2021

(54) TURBINE NOZZLE WITH REDUCED LEAKAGE FEATHER SEALS

(71) Applicant: HONEYWELL INTERNATIONAL INC., Morris Plains, NJ (US)

(72) Inventors: Benjamin Dosland Kamrath, Canby, MN (US); Jason Smoke, Phoenix, AZ (US); Daniel C. Crites, Mesa, AZ (US); Mark C. Morris, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 370 days.

(21) Appl. No.: 16/378,030

(22) Filed: Apr. 8, 2019

(65) Prior Publication Data

US 2020/0318488 A1 Oct. 8, 2020

(51) Int. Cl.
*F01D 9/04* (2006.01)
*F01D 11/00* (2006.01)

(52) U.S. Cl.
CPC ............. *F01D 9/047* (2013.01); *F01D 9/041* (2013.01); *F01D 11/005* (2013.01); *F05D 2240/57* (2013.01)

(58) Field of Classification Search
None
See application file for complete search history.

(56) References Cited

U.S. PATENT DOCUMENTS

| | | | |
|---|---|---|---|
| 4,524,980 A | 6/1985 | Lillibridge et al. | |
| 5,531,457 A | 7/1996 | Tibbott et al. | |
| 6,682,300 B2 | 1/2004 | Bolms | |
| 8,182,208 B2 | 5/2012 | Bridges, Jr. et al. | |
| 8,240,981 B2* | 8/2012 | Spangler | F01D 11/008 415/115 |
| 8,240,985 B2* | 8/2012 | Martin | F01D 11/005 415/173.1 |
| 8,430,626 B1* | 4/2013 | Liang | F02C 7/28 415/139 |
| 9,022,728 B2* | 5/2015 | Zimmermann | F01D 11/005 415/139 |
| 9,127,562 B2* | 9/2015 | Raible | F01D 5/225 |

(Continued)

FOREIGN PATENT DOCUMENTS

GB 2161220 A 1/1986

*Primary Examiner* — David E Sosnowski
*Assistant Examiner* — Jason G Davis
(74) *Attorney, Agent, or Firm* — Lorenz & Kopf, LLP

(57) ABSTRACT

A turbine nozzle for a gas turbine engine includes a plurality of nozzle segments that are configured to be assembled into a full ring such that each one of the plurality of nozzle segments is adjacent to another one of the plurality of nozzle segments. Each one of the plurality of nozzle segments includes an endwall segment and a nozzle vane. The turbine nozzle includes a feather seal interface defined by endwall segments of adjacent ones of the plurality of nozzle segments. The feather seal interface is defined along an area of reduced pressure drop through a pressure field defined between adjacent nozzle vanes of the plurality of nozzle segments to reduce leakage through the plurality of nozzle segments. The turbine nozzle includes a feather seal received within the feather seal interface that cooperates with the feather seal interface to reduce leakage through the plurality of nozzle segments.

14 Claims, 13 Drawing Sheets

(56) References Cited

U.S. PATENT DOCUMENTS

| | | | |
|---|---|---|---|
| 9,874,101 B2 * | 1/2018 | Xu | F01D 5/143 |
| 9,915,162 B2 | 3/2018 | Duguay | |
| 9,970,308 B2 | 5/2018 | Bergman | |
| 10,113,438 B2 | 10/2018 | Edwards et al. | |
| 2005/0067788 A1 | 3/2005 | Liang | |
| 2006/0082074 A1 | 4/2006 | Synnott et al. | |
| 2006/0153681 A1 * | 7/2006 | Lee | F01D 5/145 |
| | | | 416/97 R |
| 2007/0253816 A1 * | 11/2007 | Walz | F01D 5/186 |
| | | | 416/97 R |
| 2009/0053037 A1 | 2/2009 | Marini et al. | |
| 2009/0110546 A1 | 4/2009 | Tholen et al. | |
| 2010/0028143 A1 | 2/2010 | Bailey et al. | |
| 2016/0024948 A1 | 1/2016 | Tucker et al. | |
| 2018/0135418 A1 * | 5/2018 | Surace | F01D 5/147 |
| 2018/0135450 A1 | 5/2018 | Propheter-Hinckley | |
| 2018/0135451 A1 | 5/2018 | Propheter-Hinckley | |
| 2018/0135453 A1 | 5/2018 | Propheter-Hinckley et al. | |

\* cited by examiner

TURBINE NOZZLE WITH REDUCED LEAKAGE FEATHER SEALS

TECHNICAL FIELD

The present disclosure generally relates to gas turbine engines, and more particularly relates to a turbine nozzle associated with a turbine of a gas turbine engine having feather seals with reduced leakage.

BACKGROUND

Gas turbine engines may be employed to power various devices. For example, a gas turbine engine may be employed to power a mobile platform, such as an aircraft. Generally, during the operation of the gas turbine engine it is desirable to minimize leakage paths to maintain gas turbine engine performance. In order to minimize leakage paths in the gas turbine engine, turbine nozzles may be formed as a monolithic or unitary ring. Unitary ring turbine nozzles, however, may be difficult to produce, may have a lower yield and may suffer from thermo-mechanical stresses due to the nature of the unitary ring construction. Thus, in certain instances, it may be desirable to provide a turbine nozzle having a plurality of nozzle segments. Each nozzle segment, however, provides a leakage path through the turbine nozzle. The leakage between nozzle segments may be detrimental to the gas turbine engine. Generally, the leakage increases chargeable cooling flow that does not get turned by the turbine nozzle to produce work across the turbine rotor, which may increase fuel consumption. The increased leakage flow may also waste cooling flow that could be used for combustor and turbine component cooling.

Accordingly, it is desirable to provide a turbine nozzle having nozzle segments having feather seals with reduced leakage. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a turbine nozzle for a gas turbine engine. The turbine nozzle includes a plurality of nozzle segments that are configured to be assembled into a full ring such that each one of the plurality of nozzle segments is adjacent to another one of the plurality of nozzle segments. Each one of the plurality of nozzle segments includes an endwall segment and a nozzle vane. The turbine nozzle includes a feather seal interface defined by endwall segments of adjacent ones of the plurality of nozzle segments. The feather seal interface is defined along an area of reduced pressure drop through a pressure field defined between adjacent nozzle vanes of the plurality of nozzle segments. The turbine nozzle includes a feather seal received within the feather seal interface that cooperates with the feather seal interface to reduce leakage through the plurality of nozzle segments.

The area of reduced pressure drop is proximate a pressure side of one of the adjacent nozzle vanes such that the feather seal interface is defined proximate the pressure side. The feather seal interface is defined proximate the pressure side of the one of the adjacent nozzle vanes to follow a curvature of the pressure side. The one of the adjacent nozzle vanes includes a fillet defined at an interface between the pressure side and the endwall segment, and the feather seal interface is defined directly adjacent to the fillet. The turbine nozzle further includes at least one cooling region defined through one of the endwall segments proximate the feather seal interface. A throat is defined between the adjacent nozzle vanes, and the feather seal interface is defined so as to be offset from a midpoint of the throat toward a pressure side of one of the adjacent nozzle vanes. A centerline is defined between the adjacent nozzle vanes, and the feather seal interface is defined so as to be at least partially offset from the centerline toward a pressure side of one of the adjacent nozzle vanes. The feather seal has a first seal end and an opposite second seal end, with the first seal end offset from the second seal end relative to a seal longitudinal axis that extends through the feather seal. The feather seal includes at least one curved portion between the first seal end and the second seal end. The feather seal has a first seal end and an opposite second seal end and a notch is defined through the feather seal between the first seal end and the second seal end such that the feather seal is pivotable about a pivot axis defined through the feather seal. The feather seal interface includes an intersegmental gap defined between the endwall segments of the adjacent ones of the plurality of nozzle segments and a feather seal slot that intersects the intersegmental gap, with the feather seal received within the feather seal slot. The feather seal interface further comprises a lip that extends over at least the feather seal slot.

Also provided according to various embodiments is a turbine nozzle for a gas turbine engine. The turbine nozzle includes a plurality of nozzle segments that are configured to be assembled into a full ring such that each one of the plurality of nozzle segments is adjacent to another one of the plurality of nozzle segments. Each one of the plurality of nozzle segments includes an inner endwall segment, an outer endwall segment and a nozzle vane that extends between the inner endwall segment and the outer endwall segment, and each nozzle vane of the plurality of nozzle segments includes a pressure side opposite a suction side. The turbine nozzle includes a feather seal interface defined by inner endwall segments of adjacent ones of the plurality of nozzle segments. The feather seal interface is defined proximate the pressure side of each nozzle vane of the plurality of nozzle segments. The turbine nozzle includes a feather seal received within the feather seal interface that cooperates with the feather seal interface to reduce leakage through the plurality of nozzle segments.

The feather seal interface is defined proximate the pressure side of each nozzle vane of the plurality of nozzle segments to follow a curvature of the pressure side. The feather seal interface includes an intersegmental gap defined between the inner endwall segments of the adjacent ones of the plurality of nozzle segments and a feather seal slot that intersects the gap, with the feather seal received within the feather seal slot. Each nozzle vane includes a fillet defined at an interface between the pressure side and the inner endwall segment, and the feather seal interface is defined directly adjacent to the fillet. The turbine nozzle further includes at least one cooling region defined through the inner endwall segment proximate the feather seal interface. A centerline is defined between adjacent nozzle vanes of the plurality of nozzle segments, and the feather seal interface is defined so as to be at least partially offset from the centerline toward the pressure side. The feather seal has a first seal end and an opposite second seal end, with the first seal end offset from the second seal end relative to a seal longitudinal axis that extends through the feather seal.

Further provided is a turbine nozzle for a gas turbine engine. The turbine nozzle includes a plurality of nozzle segments that are configured to be assembled into a full ring such that each one of the plurality of nozzle segments is adjacent to another one of the plurality of nozzle segments. Each one of the plurality of nozzle segments includes an inner endwall segment, an outer endwall segment and a nozzle vane that extends between the inner endwall segment and the outer endwall segment, and each nozzle vane of the plurality of nozzle segments includes a pressure side opposite a suction side. The turbine nozzle includes a feather seal interface defined by inner endwall segments of adjacent ones of the plurality of nozzle segments. The feather seal interface is defined proximate the pressure side of each nozzle vane of the plurality of nozzle segments, and the feather seal interface defined to follow a curvature of the pressure side. The turbine nozzle includes a second feather seal interface defined by outer endwall segments of adjacent ones of the plurality of nozzle segments. The second feather seal interface is defined proximate the pressure side of each nozzle vane of the plurality of nozzle segments. The turbine nozzle includes a feather seal received within each of the feather seal interface and the second feather seal interface that has a first seal end and an opposite second seal end. The first seal end is offset from the second seal end relative to a seal longitudinal axis that extends through the feather seal.

A centerline is defined between adjacent nozzle vanes of the plurality of nozzle segments, and the feather seal interface and the second feather seal interface are each defined so as to be at least partially offset from the centerline toward the pressure side. The feather seal interface includes an intersegmental gap defined between the inner endwall segments of the adjacent ones of the plurality of nozzle segments and a feather seal slot that intersects the gap. The second feather seal interface includes a second gap defined between the outer endwall segments of the adjacent ones of the plurality of nozzle segments and a second feather seal slot that intersects the second gap, and the feather seal is received within each one of the feather seal slots.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
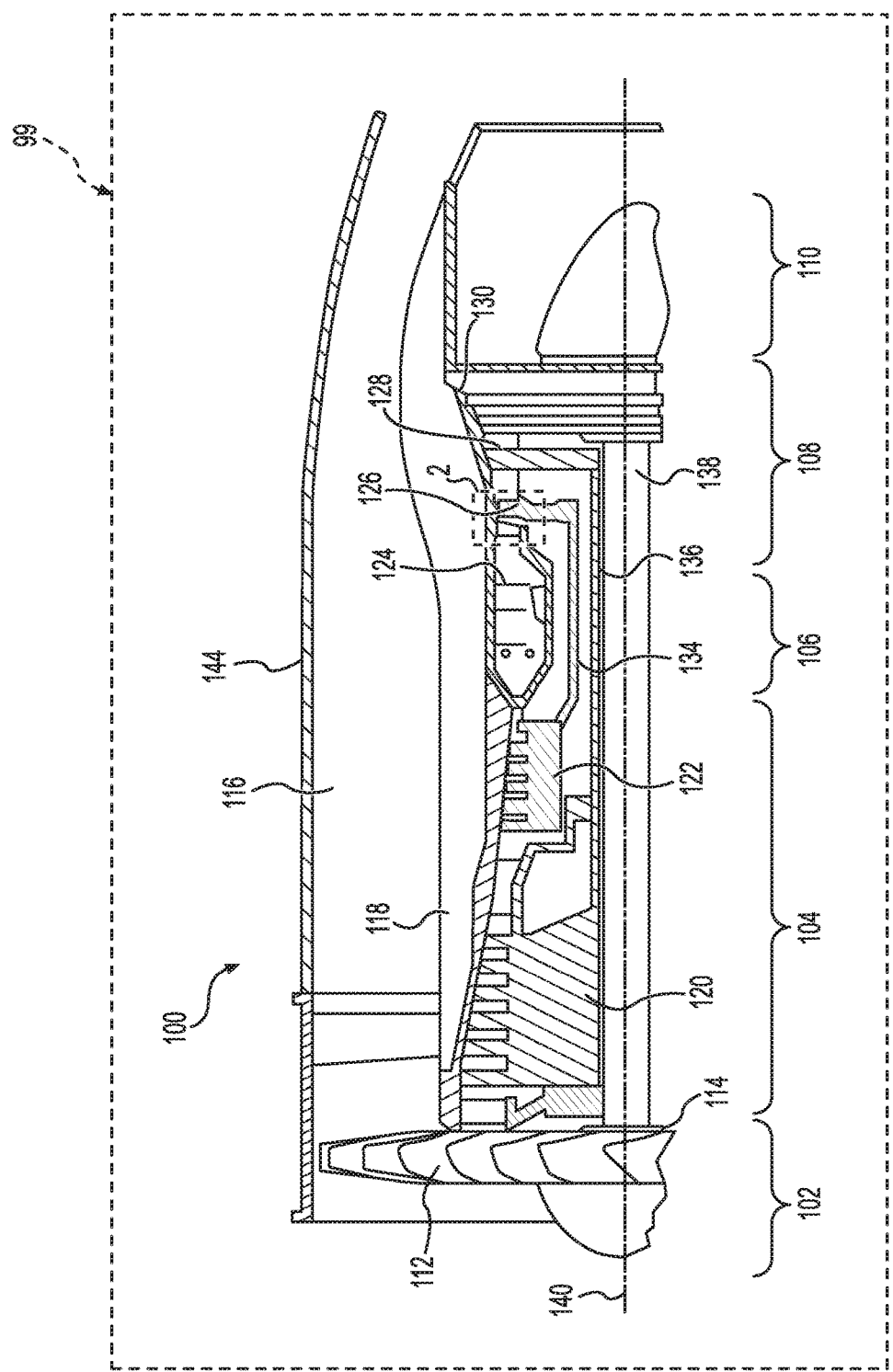
FIG. 1 is a schematic cross-sectional illustration of a gas turbine engine, which includes an exemplary turbine nozzle with reduced leakage feather seals in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from reduced leakage, and that the nozzle segments described herein for use with a turbine nozzle of a gas turbine engine is merely one exemplary embodiment according to the present disclosure. Moreover, while the turbine nozzle is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIGS. 2, 3 and 4, the gas turbine engine 100 includes a turbine nozzle 200 having one of a plurality of nozzle segments 202 that is sealed to an adjacent one of the plurality of nozzle segments 202 with a feather seal 204 that reduces leakage through the turbine nozzle 200. By providing the turbine nozzle 200 with the feather seal 204 disposed between adjacent nozzle segments 202, chargeable and non-chargeable leakage through the turbine nozzle 200 is reduced by about 40%.

In this example, with reference back to FIG. 1, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
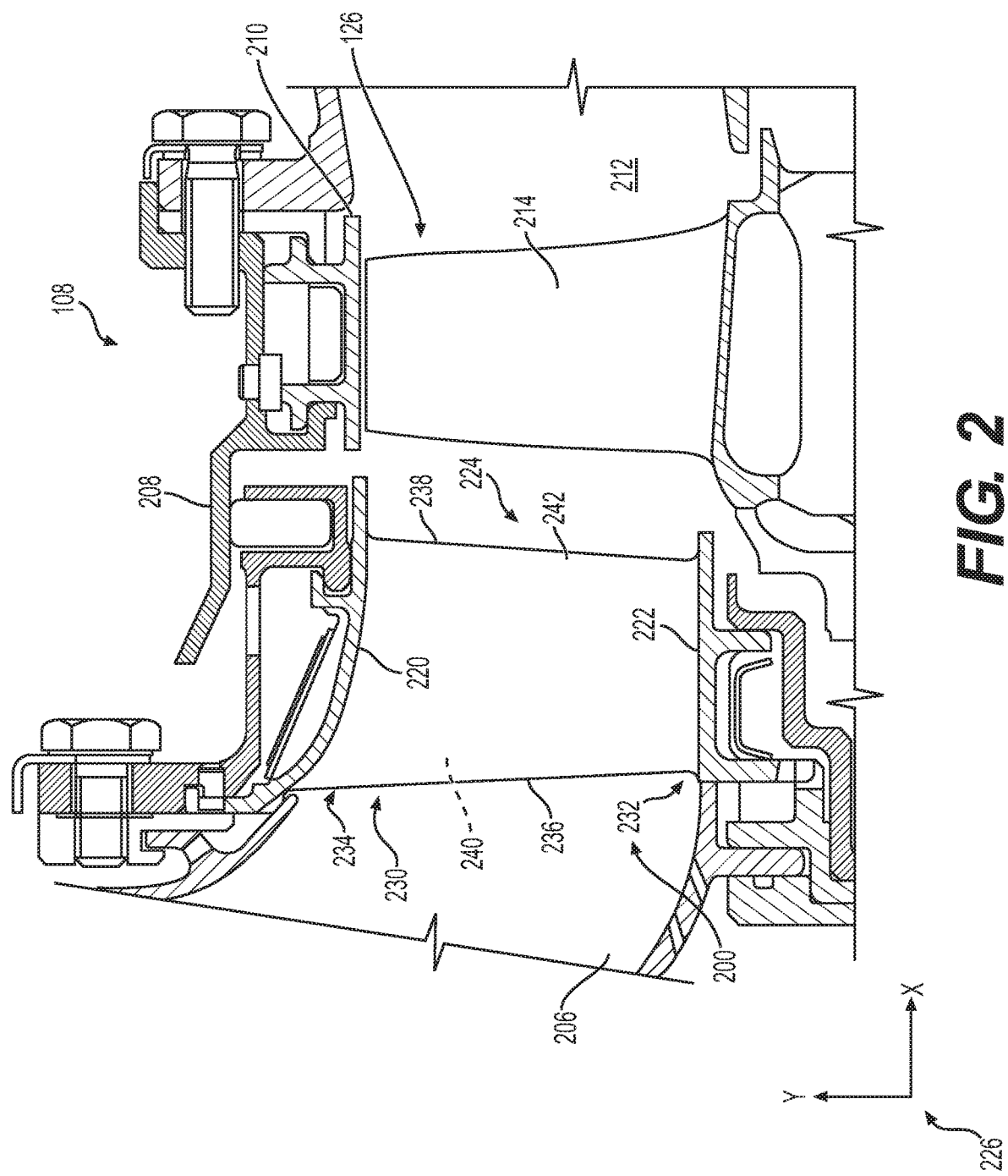
FIG. 2 is a detail cross-sectional view of the gas turbine engine of FIG. 1, taken at 2 of FIG. 1, which illustrates a portion of a turbine section of the gas turbine engine including the turbine nozzle with the reduced leakage feather seals.

With reference to FIG. 2, a portion of the turbine section 108 of the gas turbine engine 100 of FIG. 1 is shown in greater detail. In the example of FIG. 2, the turbine nozzle 200 is shown, which in this example is positioned at a downstream or outlet end 206 of the combustion chamber 124 (FIG. 1). The turbine nozzle 200 is upstream from the high pressure turbine 126. An engine case 208 surrounds the turbine section 108, and a turbine shroud 210 surrounds the high pressure turbine 126. The turbine nozzle 200 and the high pressure turbine 126 are each generally axisymmetric about the centerline or rotational or longitudinal axis 140 of gas turbine engine 100. A core gas flow path 212 extends through the gas turbine engine 100 and is defined by the combustion chamber 124, the turbine nozzle 200, the high pressure turbine 126, and the turbine shroud 210. During the operation of the gas turbine engine 100, combustive gasses are discharged from combustion chamber 124 and progress along the flow path 212. In this example, the turbine nozzle 200 is positioned immediately downstream of combustion chamber 124 and upstream of high pressure turbine 126; however, the turbine nozzle 200 may be associated with other turbines within the turbine section 108. The turbine nozzle 200 meters, accelerates, and turns the combustive gas flow from the combustion chamber 124 (FIG. 1) toward blades 214 of the high pressure turbine 126. After exiting the turbine nozzle 200, the combustive gas flow drives rotation of the high pressure turbine 126 and the spools or shafts (FIG. 1).

Generally, the turbine nozzle 200 includes an outer annular endwall 220 and an inner annular endwall 222, which are substantially concentric and radially spaced. The outer and inner annular endwalls 220, 222 bound inner and outer peripheries of a portion of the flow path 212, which extends through the turbine nozzle 200. The turbine nozzle 200 also includes a number of stationary nozzle vanes 224, one of which can be seen in the cross-section of FIG. 2. The nozzle vanes 224 are arranged in an annular array, which is located between annular endwalls 220, 222. Each nozzle vane 224 extends between annular endwalls 220, 222 in a different radial direction similar to the spokes of a wheel; the radial direction is a direction extending perpendicular to a centerline of the turbine nozzle 200, which corresponds to the Y-axis of coordinate legend 226. The axial direction is a direction perpendicular to the radial direction and parallel to the centerline of the turbine nozzle 200, which corresponds to the X-axis of the coordinate legend 226.

Each nozzle vane 224 includes an airfoil 230, an inner end 232, and an outer end 234. The airfoil 230 includes a leading edge 236, a trailing edge 238, a pressure side 240 (FIG. 3), and a suction side 242 opposite the pressure side 240. The pressure side 240 is generally concave, while the suction side 242 is generally convex. In some embodiments, the nozzle vane 224 may have an internal cooling circuit formed therein, that may extend from an opening in the first end through the nozzle vane 224 and may include various passages that eventually communicate with trailing edge openings or other openings (not shown) that may be formed in the nozzle vane 224. In certain embodiments, with reference to FIG. 3, a pair of inner endwall fillets 243a, 243b may be defined along the interface of the nozzle vane 224 with the inner annular endwall 222; and a pair of outer endwall fillets 245a, 245b may be defined along the interface of the nozzle vane 224 with the outer annular endwall 220. The fillets 243a, 243b provide a smooth transition between the airfoil 230 and the inner annular endwall 222 and the fillets 245a, 245b provide a smooth transition between the airfoil 230 and the outer annular endwall 220, which reduce stress where the surfaces meet. The fillets 243a, 245a are defined at the interface along the pressure side 240, and the fillets 243b, 245b are defined at the interface along the suction side 242. It should be noted that in certain embodiments, the airfoil 230 may be devoid of one or more of the fillets 243a, 243b, 245a, 245b.

Figure 3:
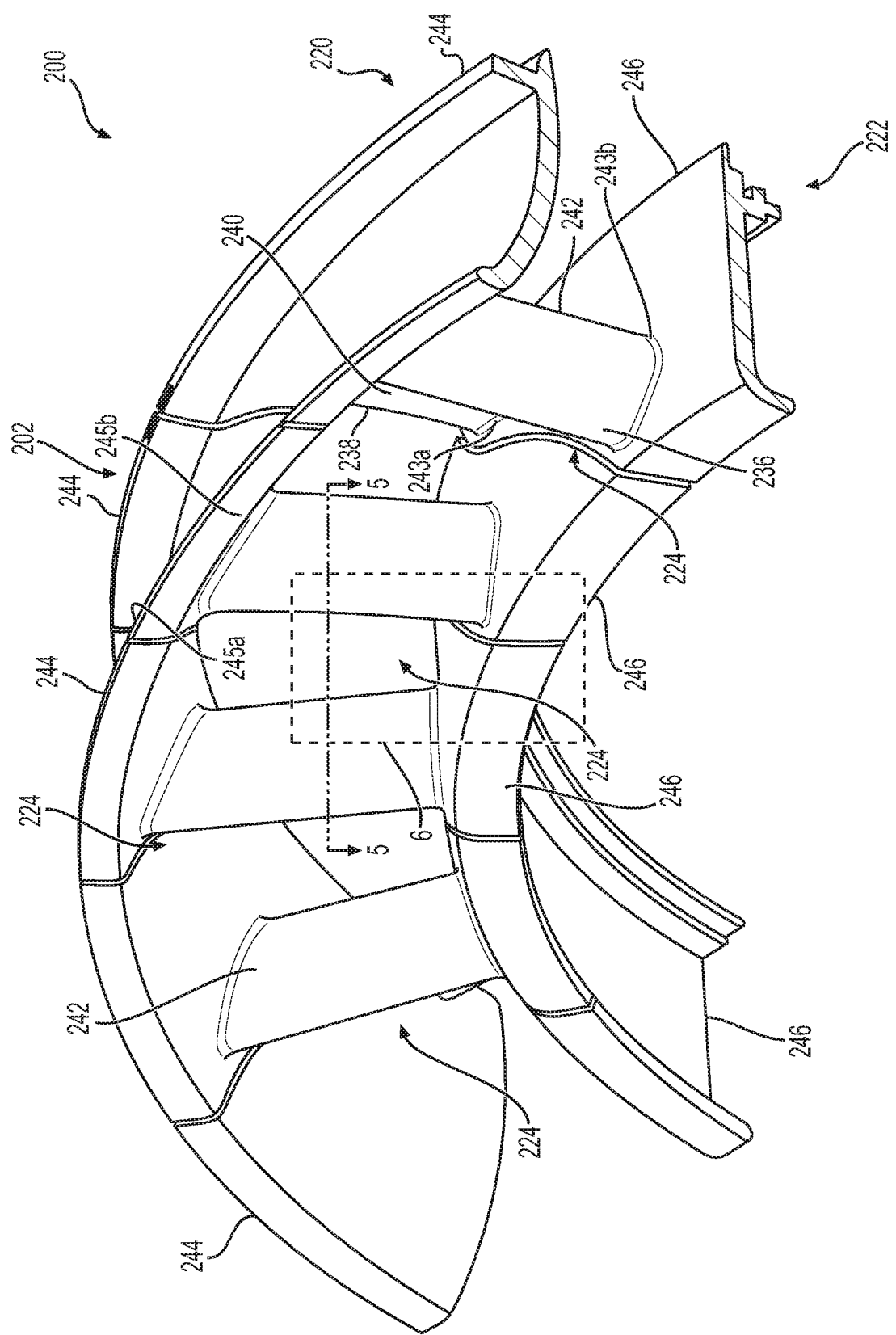
FIG. 3 is a perspective view of a portion of the turbine nozzle of FIG. 2.

In FIG. 3, a portion the turbine nozzle 200 is shown in greater detail. In one example, the turbine nozzle 200 is segmented or is not a monolithic or unitary ring, and includes the plurality of nozzle segments 202 that are assembled together to form a full-ring. Each of the nozzle segments 202 include an outer endwall segment 244, an inner endwall segment 246 and one or more of the nozzle vanes 224, which extend radially between the endwall segments 244, 246. The outer endwall segments 244, when assembled, form the outer annular endwall 220, and the inner endwall segments 246, when assembled, formed the inner annular endwall 222. Thus, the annular endwalls 220, 222, in this example, comprise segmented annular endwalls that are assembled into a ring. In one example, each of the nozzle segments 202 include a single one of the nozzle vanes 224, which extends between the respective endwall segments 244, 246; however, the nozzle segments 202 may include two nozzle vanes 224 (doublets), three nozzle vanes 224 (triplets), four nozzle vanes 224 (quadruplet), etc. It should be noted that while FIG. 3 depicts the turbine nozzle 200 with a plurality of singlet nozzle segments 202, the turbine nozzle 200 may be manufactured with combinations of singlets, doublets, triplets, quadruplets, etc.

Figure 4:
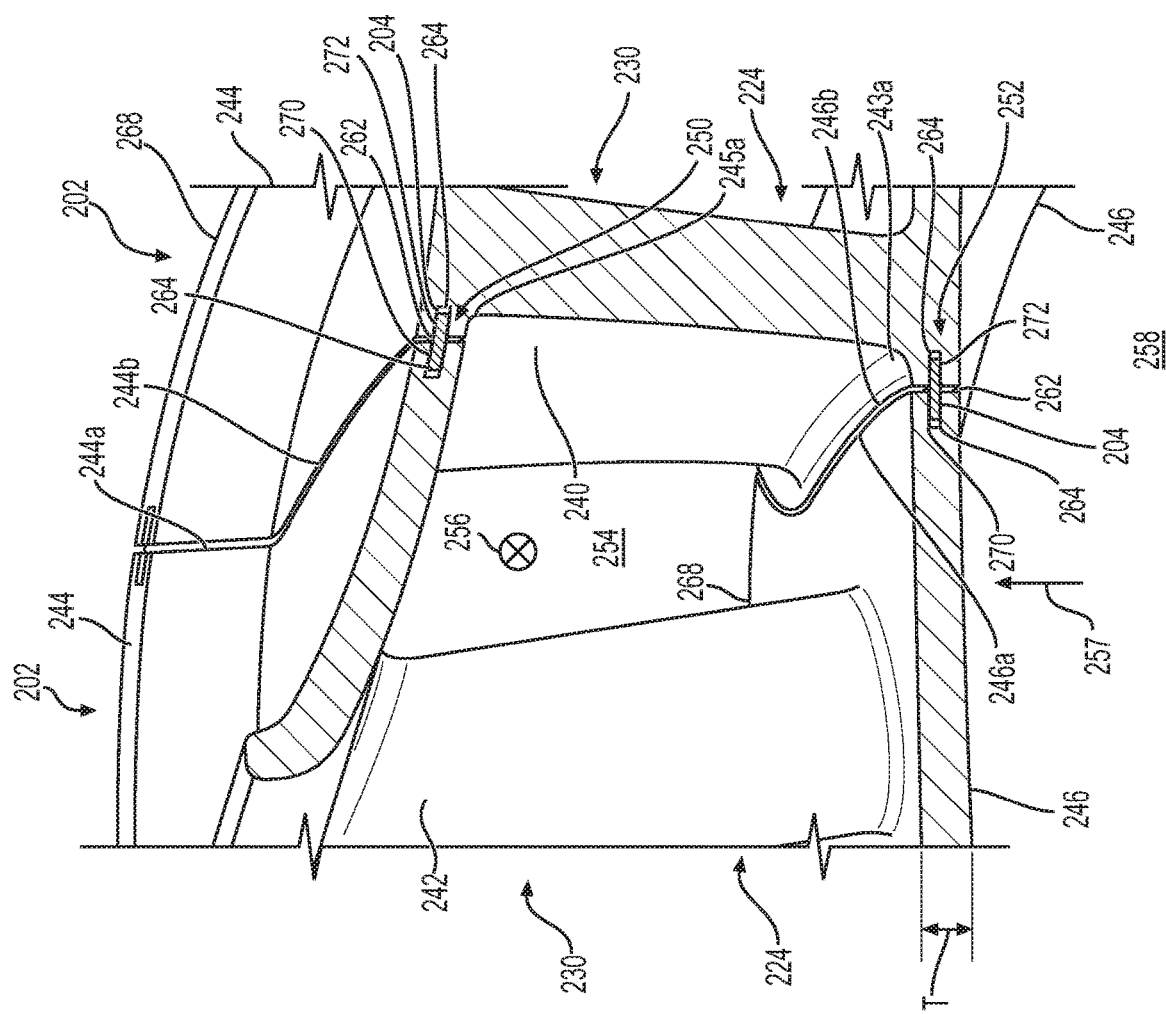
FIG. 4 is a cross-sectional view of the turbine nozzle of FIG. 3, taken parallel to the page.

In order to reduce leakage between adjacent nozzle segments 202, at least one of the feather seals 204 (FIG. 4) is coupled between the adjacent nozzle segments 202. Generally, in order to reduce leakage about the turbine nozzle 200, at least one of the feather seals 204 is coupled between each adjacent nozzle segment 202. In one example, the adjacent nozzle segments 202 cooperate to define a plurality of feather seal interfaces 250, 252 that each receives one of the feather seals 204. With reference to FIG. 4, one of the feather seal interfaces 250 defined in respective portions of adjacent outer endwall segments 244 and one of the feather seal interfaces 252 defined in respective portions of adjacent inner endwall segments 246 is shown in greater detail. It should be understood that as each of the feather seal interfaces 250 is the same, in the interest of brevity, a single one of the feather seal interfaces 250 will be described in detail herein with the understanding that the remainder of the feather seal interfaces 250 of the turbine nozzle 200 is the same. Further, it should be understood that as each of the feather seal interfaces 252 is the same, in the interest of brevity, a single one of the feather seal interfaces 252 will be described in detail herein with the understanding that the remainder of the feather seal interfaces 252 of the turbine nozzle 200 is the same. In the example of FIG. 4, the feather seal interface 250 is defined in respective portions of the outer endwall segments 244 between the adjacent nozzle segments 202, and the feather seal interface 252 is defined in respective portions of the inner endwall segments 246 between the adjacent nozzle segments 202. The feather seal interface 250 is defined through the outer endwall segments 244 so as to be positioned proximate the pressure side 240 of the nozzle vane 224, and the feather seal interface 252 is defined through the inner endwall segments 246 so as to be positioned proximate the pressure side 240 of the nozzle vane 224. By positioning the feather seal interfaces 250, 252 proximate the pressure side surface 240, leakage through the feather seal interfaces 250, 252, and thus, the feather seals 204 is reduced.

In this regard, with continued reference to FIG. 4, an airflow path 254 is defined between airfoils 230 of adjacent nozzle vanes 224. The airflow path 254 is part of the flow path 212 and is in fluid communication with the flow path 212 (FIG. 2) to receive the combustive gas flow. Generally, high pressure combustive gas flow 256 from the combustion chamber 124 (FIG. 1) flows through the airflow path 254, while cooler, yet higher pressure fluid 257 from a plenum 258 associated with the combustion chamber 124 (FIG. 1) is present beneath the inner endwall segments 246. In addition, cooler, yet higher pressure fluid 257 from the plenum 258 associated with the combustion chamber 124 (FIG. 1) is present above the outer endwall segments 244. Based on a pressure of the cooler, higher pressure fluid 257 from the plenum 258 and a pressure of the high pressure combustive gas flow 256, computational fluid analysis, using Star-CCM+ by Siemens PLM of Plano, Tex., United States of America, for example, may be performed to determine a pressure field in the airflow path 254 between the adjacent nozzle vanes 224. Based on the pressure field, one or more areas of reduced pressure drop may be determined. The feather seal interfaces 250, 252 are defined within the endwall segments 244, 246 so as to be positioned within the airflow path 254 along a line that interconnects the area(s) of reduced pressure drop. In this example, the feather seal interfaces 250, 252 are defined through the endwall segments 244, 246 proximate the pressure side 240 so as to be defined directly adjacent to the fillets 243a, 245a along a curved line that follows the area(s) of reduced pressure drop. In other words, the feather seal interfaces 250, 252 are defined to follow the curvature of the pressure side 240 of the nozzle vane 224, and are defined proximate the pressure side 240 and directly adjacent to the fillets 243a, 245a.

Figure 5:
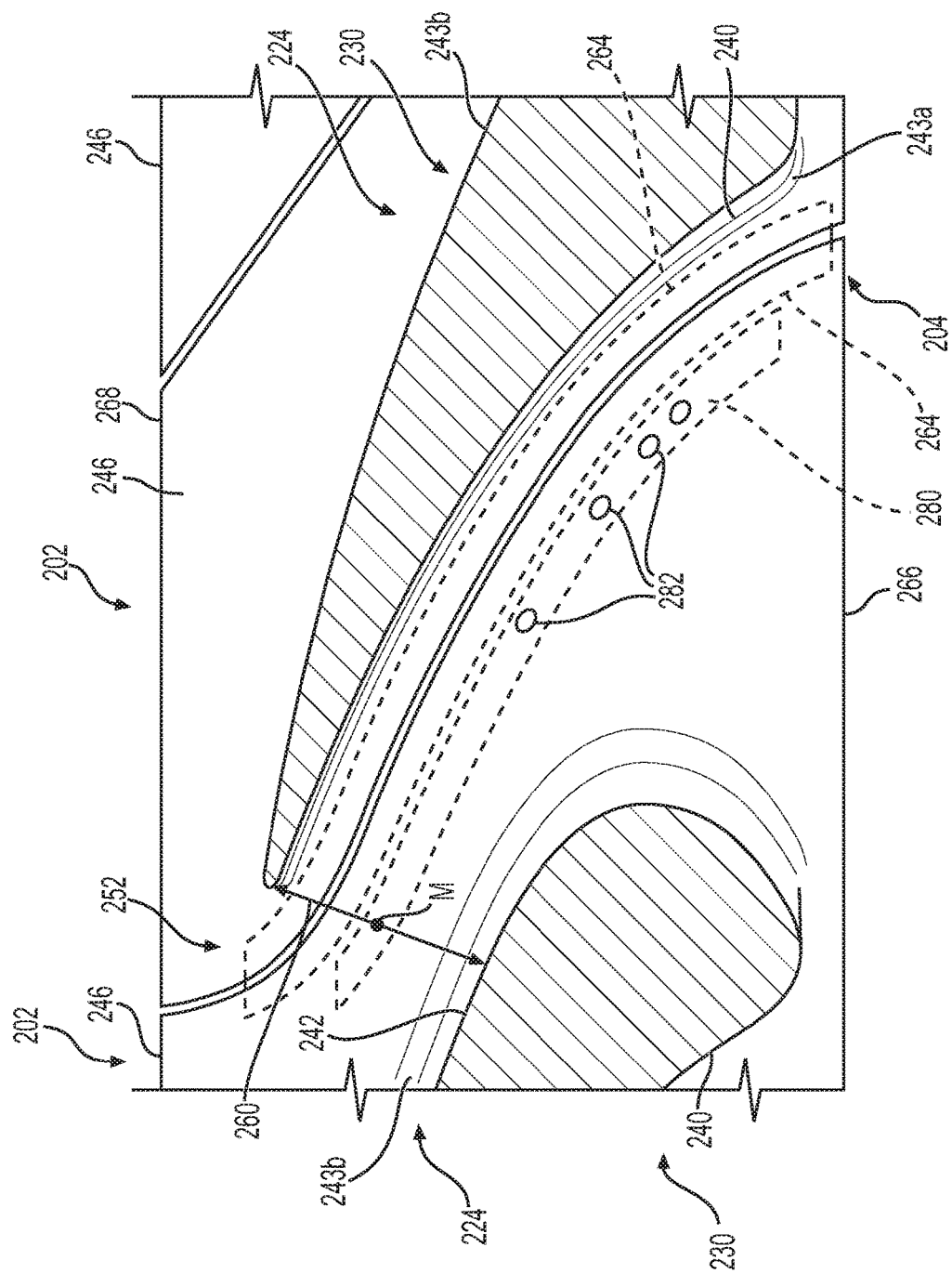
FIG. 5 is a cross-sectional view of a portion of the turbine nozzle of FIG. 3, taken along line 5-5 of FIG. 3.
Figure 6:
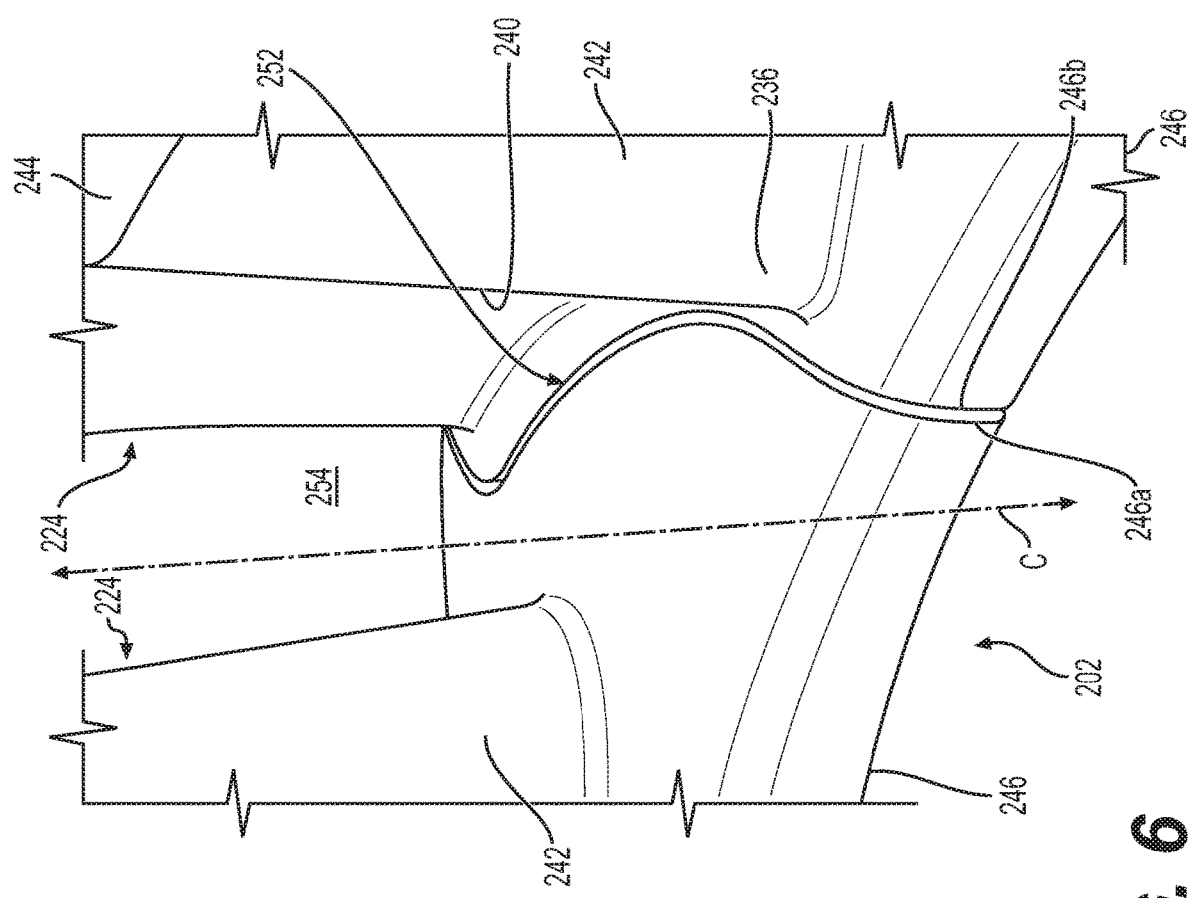
FIG. 6 is a detail perspective view of an exemplary feather seal interface including an intersegmental gap and a feather seal slot for the turbine nozzle of FIG. 3, taken at 6 on FIG. 3.

Stated another way, with reference to FIG. 5, a cross-sectional view of the turbine nozzle 200 is shown. A throat 260 or minimum physical distance between the airfoils 230 is defined within the airflow path 254. The feather seal interfaces 250, 252 are defined within the airflow path 254 so as to be offset from a midpoint M of the throat 260 toward the pressure side 240. With reference to FIG. 6, a detail view of the feather seal interface 252 is shown. As shown in FIG. 6, the airflow path 254 is defined between the pressure side 240 of one of the airfoils 230 and the suction side 242 of the other airfoil 230 of the adjacent nozzle vanes 224. The airflow path 254 has a centerline C. Each of the feather seal interfaces 250, 252 are defined within the airflow path 254 so as to be offset from the centerline C toward the pressure side 240 along a line that interconnects the lowest pressure drop in the pressure field defined between the adjacent nozzle vanes 224.

In this example, with reference back to FIG. 4, the feather seal interfaces 250, 252 are curved to follow along the fillet 243a, 245a proximate the pressure side 240 of the airfoil 230. The feather seal interfaces 250, 252 are defined to have a generally cross-shape, however, the feather seal interfaces 250, 252 may have a different shape. In this example, the feather seal interfaces 250, 252 are each defined by an intersegmental gap 262 and a feather seal slot 264. The feather seal slot 264 intersects the gap 262, and the gap 262 is defined by and between the adjacent endwall segments 244, 246. The gap 262 is defined in the radial direction, and extends between the endwall segments 244, 246. Generally, the gap 262 is defined by terminal ends 244a, 244b; 246a, 246b of the adjacent endwall segments 244, 246. Each of the endwall segments 244 includes one of the terminal ends 244a opposite the other terminal end 244b; and each of the endwall segments 246 includes one of the terminal ends 246a opposite the other terminal end 246b. The feather seal slot 264 is defined through a portion of a thickness T of the endwall segments 244, 246, and extends from a first side 266 of the endwall segments 244, 246 (FIG. 5) to an opposite, second side 268 of the endwall segments 244, 246. The feather seal slot 264 is defined in each of the endwall segments 244, 246 to receive a portion of the feather seal 204.

Figure 7:
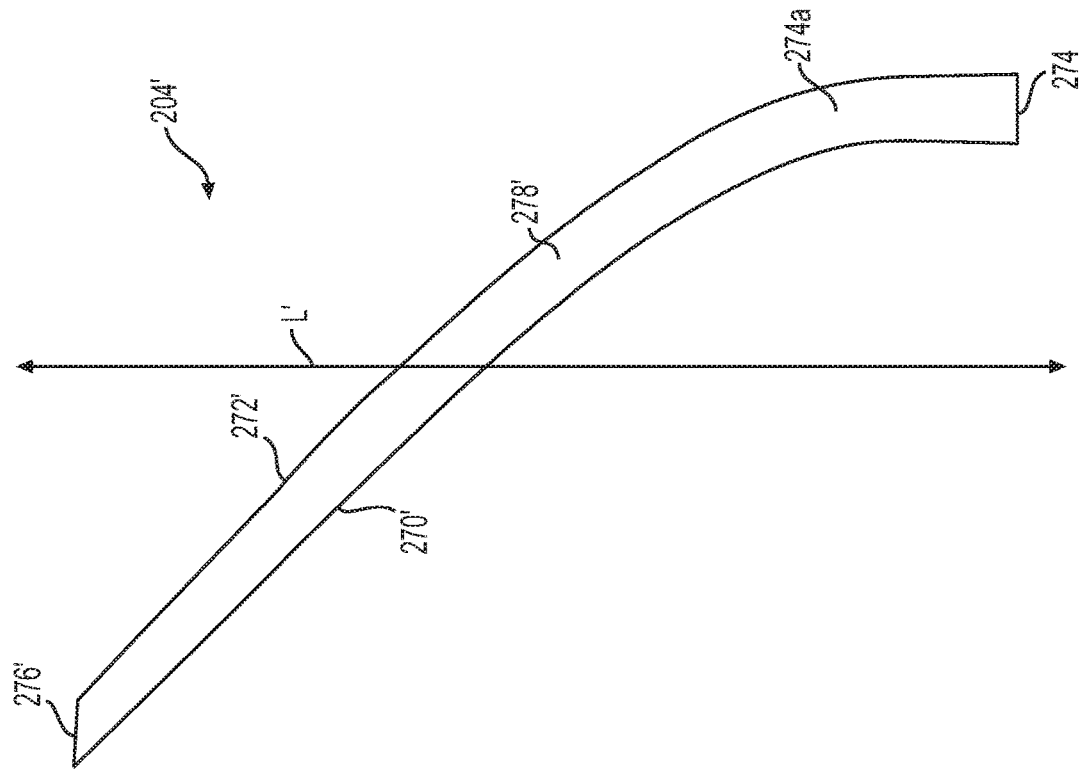
FIG. 7 is a top view of an exemplary feather seal that is received within the feather seal slots associated with the feather seal interfaces of the turbine nozzle of FIG. 3 in accordance with various embodiments.

With reference to FIG. 7, a top view of the feather seal 204 is shown. As shown in FIG. 7, the feather seal 204 includes a first seal side 270 opposite a second seal side 272, and a first seal end 274 opposite a second seal end 276. The feather seal 204 is composed of a metal, including, but not limited to cobalt or nickel based alloys; and may be cast, molded, punched, etc. In this example, the feather seal 204 is curved to follow the curvature of the feather seal interfaces 250, 252. Thus, the first seal end 274 of the feather seal 204 is offset from the second seal end 276 relative to a seal longitudinal axis L. The first seal end 274 includes a curved portion 274a and the second seal end 276 includes a curved portion 276a. The curved portions 274a, 276a are interconnected by a body portion 278, which is substantially planar. The curved portions 274a, 276a enable the feather seal 204 to follow the curvature of the feather seal interfaces 250, 252 proximate the pressure side 240 of the airfoil 230 (FIG. 4). With reference to FIG. 4, the first seal side 270 is coupled to or received within the feather seal slot 264 of one of the endwall segments 244, 246 and the second seal side 272 is coupled to or received within the feather seal slot 264 of the adjacent other one of the endwall segments 244, 246. Thus, the feather seal slots 264 of the adjacent endwall segments 244, 246 cooperate to receive the feather seal 204 and to retain the feather seal 204 within the feather seal interfaces 250, 252.

Figure 8:
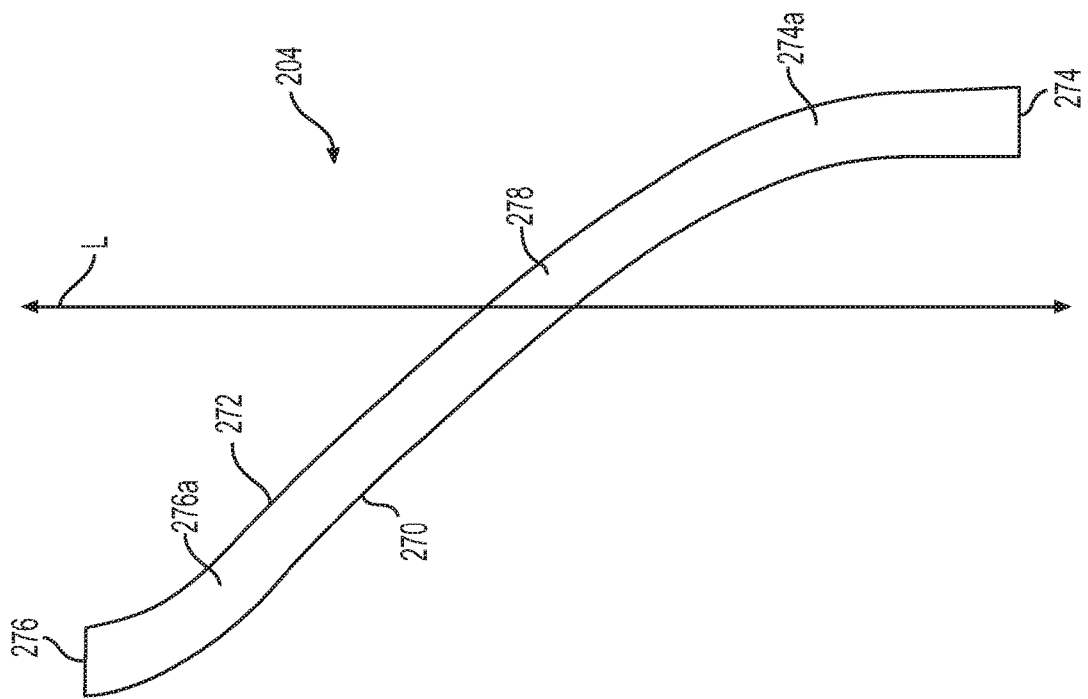
FIG. 8 is a top view of another exemplary feather seal that is received within the feather seal slots of the feather seal interfaces associated with the turbine nozzle of FIG. 3 in accordance with various embodiments.

It should be noted that in other embodiments, depending upon the location of the pressure field between the adjacent nozzle vanes 224, the feather seal 204 may have a different shape. For example, with reference to FIG. 8, a feather seal 204' is shown. The feather seal 204' includes a first seal side 270' opposite a second seal side 272', and the first seal end 274 opposite a second seal end 276'. The feather seal 204' is composed of a metal, including, but not limited to cobalt or nickel based alloys; and may be cast, molded, punched, etc. In this example, the first seal end 274 of the feather seal 204 is offset from the second seal end 276' relative to a seal longitudinal axis L'. The first seal end 274 includes the curved portion 274a, and the second seal end 276' is straight or devoid of a curved portion. The curved portion 274a is interconnected by a body portion 278', which is substantially planar. Generally, the feather seals 204, 204' are thin and have a flat surface to conform with a mating surface defined by the feather seal interfaces 250, 252 to create a seal. The feather seals 204, 204' are each typically rectangular in cross sectional area with generally a constant thickness of between about 0.003 inches to about 0.020 inches. In other embodiments, a varying cross sectional area and varying feather seal thickness may be employed to enhance sealing and minimize leakage across the feather seals 204, 204'.

With reference back to FIG. 5, in certain embodiments, the inner endwall segments 246 may also define a cooling region, generally indicated by 280. The cooling region 280 may be defined through the inner endwall segments 246 proximate to the feather seal interface 252. The cooling region 280 may include at least one or a plurality of film cooling holes 282, which are defined through the inner endwall segments 246 to provide fluid communication between the plenum 258 (FIG. 4) and the airflow path 254. Generally, the film cooling holes 282 enable the cooler, high pressure air from the plenum 258 (FIG. 4) to cool the inner endwall segments 246 and the adjacent nozzle vanes 224. This may improve an operating life of both the inner endwall segments 246 and the nozzle vanes 224. It should be noted that in certain embodiments, the outer endwall segments 244 may also include the cooling region 280.

With reference to FIG. 3, in one example, each of the nozzle segments 202 are integrally formed, monolithic or one-piece, and are composed of a metal or metal alloy. Generally, the nozzle segments 202 are composed of an oxidation and stress rupture resistant, single crystal, nickel-based superalloy, including, but not limited to, the nickel-based superalloy commercially identified as "CMSX 4" or the nickel-based superalloy identified as "SC180." Alternatively, the nozzle segments 202 may be composed of directionally solidified nickel base alloys, including, but not limited to, Mar-M-247DS. As a further alternative, the nozzle segments 202 may be composed of polycrystalline alloys, including, but not limited to, Mar-M-247EA.

In one example, the nozzle segments 202 may be manufactured according to investment casting, using an additive manufactured ceramic core, for example. It should be noted that alternatively, the nozzle segments 202 may be formed using conventional dies with one or more portions of the core (or portions adjacent to the core) comprising a fugitive core insert. As a further alternative, the nozzle segments 202 including the feather seal interfaces 250, 252 may be formed using other additive manufacturing processes, including, but not limited to, direct metal laser sintering, binder jet printing, etc. As a further alternative, the nozzle segments 202 may be cast or formed with additive manufacturing, and the feather seal interfaces 250, 252 may be machined in the nozzle segments 202 via grinding, milling, wire electrical discharge machining (EDM), plunge EDM, electrochemical machining, etc. In other embodiments, the nozzle segments 202 may comprise monolithic ceramics such as silicon nitride or may comprise ceramic matrix composite (CMC) materials such as Ox-Ox or SiC—SiC.

With the nozzle segments 202 and the feather seals 204 or 204' formed, the feather seals 204 or 204' may be positioned within each of the feather seal slots 264 of the feather seal interfaces 250, 252. The nozzle segments 202 may be positioned in an annular array and coupled together via brazing, etc. In other embodiments, the nozzle segments 202 may be configured differently. For example, the nozzle segments 202 may be formed with one of the outer endwall segment 244 and the inner endwall segment 246 coupled to the nozzle vane 224. The other of the outer endwall or the inner endwall may be cast as a unitary ring, which is coupled to the nozzle segment 202 via brazing, bi-casting, etc. Thus, in certain embodiments, the nozzle segments 202 may define one of the feather seal interfaces 250, 252 via the endwall segments 244, 246 and the other of the outer endwall or inner endwall may comprise a unitary ring devoid of the respective one of the feather seal interfaces 250, 252. In one example, the nozzle segments 202 may include the inner endwall segments 246 that define the feather seal interfaces 252, and the outer endwall may comprise a unitary ring devoid of the feather seal interfaces 250, which is coupled to the nozzle vanes 224 via brazing, bi-casting, etc.

With the turbine nozzle 200 formed, the turbine nozzle 200 is installed into the gas turbine engine 100 (FIG. 1). In use, as the gas turbine engine 100 operates, the combustive gases flow from the combustion chamber 124 (FIG. 1) through the airflow path 254. The feather seal interfaces 250, 252 and the feather seals 204 cooperate to reduce leakage of the cooler, higher pressure fluid 257 from the plenum 258 (FIG. 4) into the airflow path 254. This reduces chargeable and non-chargeable leakage flow up to about 40%, which provides additional cooling fluid for the combustion chamber 124 and turbine section 108 (FIG. 1). Moreover, with the placement of the feather seal interfaces 250, 252 along the area(s) of reduced pressure drop, the cooling region 280 may be defined through the inner endwall segments 246, which enables enhanced impingement cooling coverage of the inner endwall segments 246. This increases operating life of the inner annular endwall 222 and the nozzle vanes 224. Further, by moving the feather seal interfaces 250, 252 proximate the pressure side 240, tripping or interrupting of the cooling fluid through the film cooling holes 282 is reduced as there is no step in the airflow path 254 due to misalignment between adjacent segments. This allows a cooling film created by the film cooling holes 282 to stay attached to the inner annular endwall 222 longer, which lowers a heat load on a surface of the inner endwall segments 246. Further, the placement of the feather seal interfaces 250, 252 proximate the pressure side 240 also moves the feather seals 204, 204' away from the combustive gases that flow through the airflow path 254. This reduces a heat load acting on the feather seals 204, 204', which prolongs an operating life of the feather seals 204, 204'. In addition, by defining the feather seal interfaces 250, 252 proximate the pressure side 240, showerhead film holes may be defined in the nozzle vanes 224, if desired, which improves cooling of the nozzle vanes 224. In addition, in the example of the turbine nozzle 200 as a high pressure turbine nozzle, the placement of the feather seal interfaces 250, 252 improves specific fuel consumption for the gas turbine engine 100 (FIG. 1) by up to about 0.2%.

It should be noted that in other embodiments, the feather seal interfaces 250, 252 of the turbine nozzle 200 may be configured differently to receive the feather seal 204 to reduce leakage between adjacent nozzle segments 202. For example, with reference to FIG. 9, a turbine nozzle 300 is shown with feather seal interfaces 350, 352 for receiving a feather seal 304. As the turbine nozzle 300 includes components that are the same or similar to components of the turbine nozzle 200 discussed with regard to FIGS. 1-8, the same reference numerals will be used to denote the same or similar components.

Figure 9:
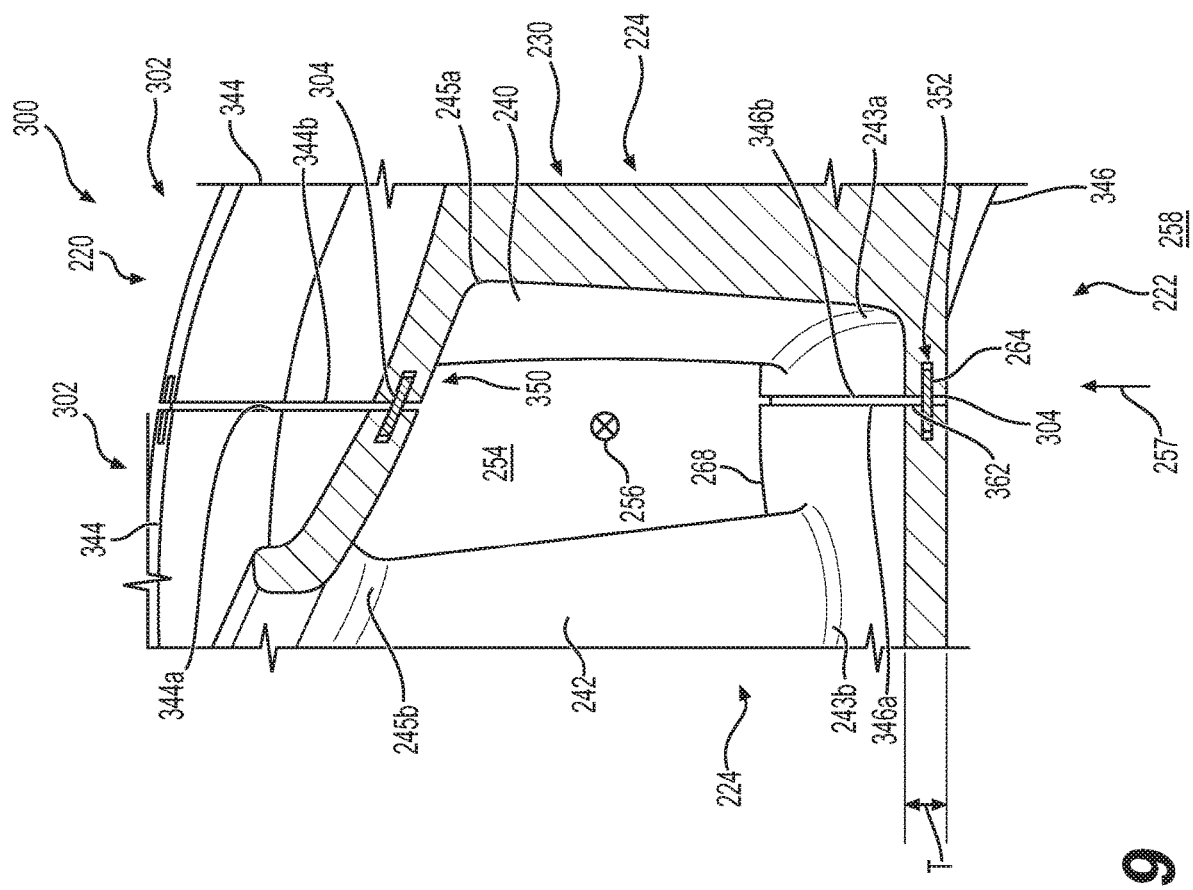
FIG. 9 is a cross-sectional view of another exemplary turbine nozzle for use with the gas turbine engine of FIG. 1.

In FIG. 9, a portion the turbine nozzle 300 is shown. In one example, the turbine nozzle 300 is segmented or is not a monolithic or unitary ring, and includes the plurality of nozzle segments 302 that are assembled together to form a full-ring. Each of the nozzle segments 302 include an outer endwall segment 344, an inner endwall segment 346 and one or more of the nozzle vanes 224, which extend radially between the endwall segments 344, 346. The outer endwall segments 344, when assembled, form the outer annular endwall 220, and the inner endwall segments 346, when assembled, formed the inner annular endwall 222. Thus, the annular endwalls 220, 222, in this example, comprise segmented annular endwalls that are assembled into a ring. In one example, each of the nozzle segments 302 include a single one of the nozzle vanes 224, which extends between the respective endwall segments 344, 346; however, the nozzle segments 302 may include two nozzle vanes 224 (doublets), three nozzle vanes 224 (triplets), four nozzle vanes 224 (quadruplet), etc. It should be noted that while FIG. 9 depicts the turbine nozzle 300 with a plurality of singlet nozzle segments 302, the turbine nozzle 300 may be manufactured with combinations of singlets, doublets, triplets, quadruplets, etc.

In order to reduce leakage between adjacent nozzle segments 302, at least one of the feather seals 304 is coupled between the adjacent nozzle segments 302. Generally, in order to reduce leakage about the turbine nozzle 300, at least one of the feather seals 304 is coupled between each adjacent nozzle segment 302. In one example, the adjacent nozzle segments 302 cooperate to define the plurality of feather seal interfaces 350, 352 that each receives one of the feather seals 304. In FIG. 9, one of the feather seal interfaces 350 defined in respective portions of adjacent outer endwall segments 344 and one of the feather seal interfaces 352 defined in respective portions of adjacent inner endwall segments 346 is shown. It should be understood that as each of the feather seal interfaces 350 is the same, in the interest of brevity, a single one of the feather seal interfaces 350 will be described in detail herein with the understanding that the remainder of the feather seal interfaces 350 of the turbine nozzle 300 is the same. Further, it should be understood that as each of the feather seal interfaces 352 is the same, in the interest of brevity, a single one of the feather seal interfaces 352 will be described in detail herein with the understanding that the remainder of the feather seal interfaces 352 of the turbine nozzle 300 is the same. In the example of FIG. 9, the feather seal interface 350 is defined in respective portions of the outer endwall segments 344 between the adjacent nozzle segments 302, and the feather seal interface 352 is defined in respective portions of the inner endwall segments 346 between the adjacent nozzle segments 302. The feather seal interface 350 is defined through the outer endwall segments 344 so as to be positioned proximate the pressure side 240 of the nozzle vane 224, and the feather seal interface 352 is defined through the inner endwall segments 346 so as to be positioned proximate the pressure side 240 of the nozzle vane 224. By positioning the feather seal interfaces 350, 352 proximate the pressure side surface 240, leakage through the feather seal interfaces 350, 352, and thus, the feather seals 304 is reduced.

In this regard, as discussed, with reference to FIG. 9, the airflow path 254 is defined between airfoils 230 of adjacent nozzle vanes 224, and the airflow path 254 is part of and in communication with the flow path 212 to receive the combustive gas flow. The high pressure combustive gas flow 256 from the combustion chamber 124 (FIG. 1) flows through the airflow path 254, and the cooler, higher pressure fluid 257 from the plenum 258 (FIG. 9) is present beneath the inner endwall segments 346 and above the outer endwall segments 344. Based on a determination of the pressure field, using computational fluid analysis, as discussed, one or more areas of reduced pressure drop may be determined. The feather seal interfaces 350, 352 are defined within the endwall segments 344, 346 so as to be positioned within the airflow path 254 along a line that interconnects the area(s) of reduced pressure drop. In this example, the feather seal interfaces 350, 352 are defined through the endwall segments 344, 346 proximate the pressure side 240 so as to be defined directly adjacent to the fillets 243a, 245a along a substantially straight line.

Figure 10:
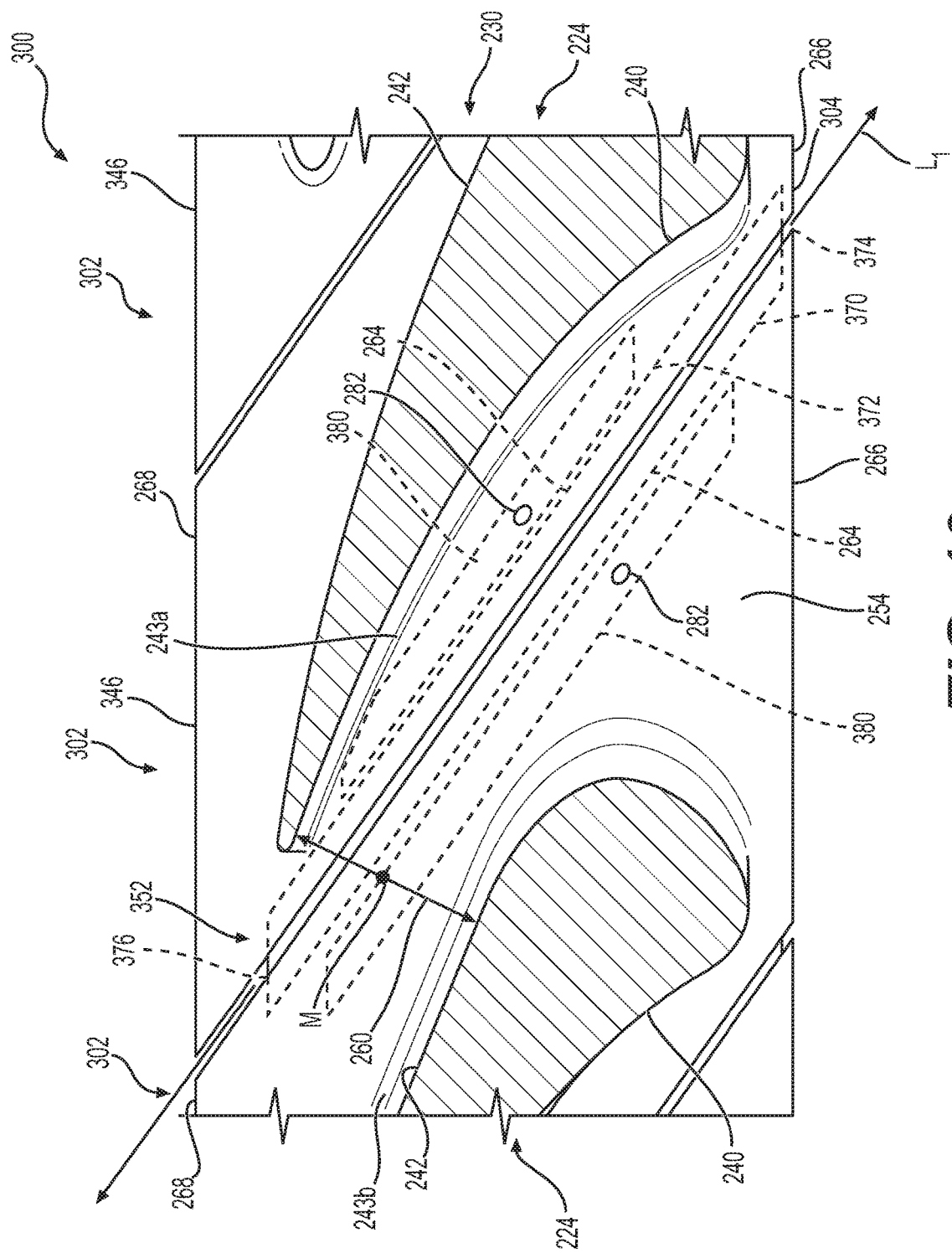
FIG. 10 is a cross-sectional view of a portion of the turbine nozzle of FIG. 9, oriented and positioned similarly to FIG. 5.
Figure 11:
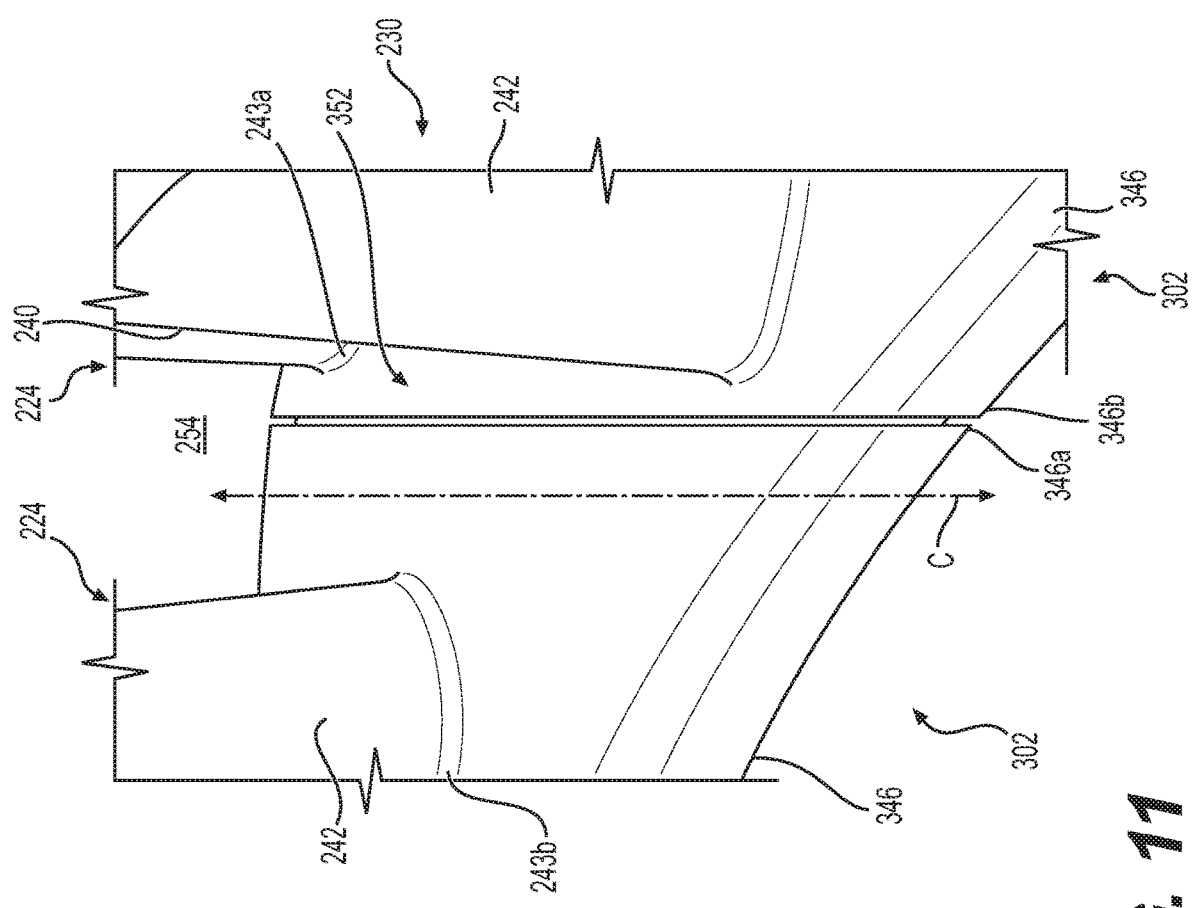
FIG. 11 is a detail perspective view of a feather seal interface including an intersegmental gap and feather seal slot for the turbine nozzle of FIG. 9.

Stated another way, with reference to FIG. 10, a cross-sectional view of the turbine nozzle 300 is shown. The throat 260 is defined within the airflow path 254. The feather seal interfaces 350, 352 are defined within the airflow path 254 so as to be at least partially offset from the midpoint M of the throat 260 toward the pressure side 240. With reference to FIG. 11, a detail view of the feather seal interface 352 is shown. As shown in FIG. 11, the airflow path 254 is defined between the pressure side 240 of one of the airfoils 230 and the suction side 242 of the other airfoil 230 of the adjacent nozzle vanes 224. The airflow path 254 has the centerline C. Each of the feather seal interfaces 350, 352 are defined within the airflow path 254 so as to be offset from the centerline C toward the pressure side 240 along a line that interconnects the lowest pressure drop in the pressure field defined between the adjacent nozzle vanes 224, and in this example, the feather seal interfaces 350, 352 are defined along a substantially straight line. By positioning the feather seal interfaces 350, 352 offset toward the pressure side 240 instead of near the centerline C, leakage through the feather seal interfaces 350, 352 is reduced.

In this example, with reference back to FIG. 9, the feather seal interfaces 350, 352 are defined straight along the endwall segments 344, 346 proximate the fillet 243a, 245a and proximate the pressure side 240 of the airfoil 230. By defining the feather seal interfaces 350, 352 straight along the endwall segments 344, 346 the leakage is reduced through the feather seal interfaces 350, 352. The feather seal interfaces 350, 352 are defined to have a generally cross-shape, however, the feather seal interfaces 350, 352 may have a different shape. In this example, the feather seal interfaces 350, 352 are each defined by an intersegmental gap 362 and the feather seal slot 264. The feather seal slot 264 intersects the gap 362. Generally, the gap 362 is defined by and between the adjacent endwall segments 344, 346. The gap 362 is defined in the radial direction, and extends between the endwall segments 344, 346. Generally, the gap 362 is defined by terminal ends 344a, 344b; 346a, 346b of the adjacent endwall segments 344, 346. Each of the endwall segments 344 includes one of the terminal ends 344a opposite the other terminal end 344b; and each of the endwall segments 346 includes one of the terminal ends 346a opposite the other terminal end 346b. The feather seal slot 264 is defined through a portion of the thickness T of the endwall segments 344, 346, and extends from the first side 266 of the endwall segments 344, 346 (FIG. 10) to an opposite, second side 268 of the endwall segments 344, 346. The feather seal slot 264 is defined in each of the endwall segments 344, 346 to receive a portion of the feather seal 304.

With reference to FIG. 10, a top view of the feather seal 304 is shown. As shown in FIG. 10, the feather seal 304 includes a first seal side 370 opposite a second seal side 372, and a first seal end 374 opposite a second seal end 376. The feather seal 304 is composed of a metal, including, but not limited to cobalt or nickel based alloys; and may be cast, molded, punched, etc. In this example, the feather seal 304 is shaped to follow the feather seal interfaces 350, 352, and thus, the feather seal 304 is linear or straight along a longitudinal axis L1 of the feather seal 304. The first seal side 370 is coupled to or received within the feather seal slot 264 of one of the endwall segments 344, 346 and the second seal side 372 is coupled to or received within the feather seal slot 264 of the adjacent other one of the endwall segments 344, 346. Thus, the feather seal slots 264 of the adjacent endwall segments 344, 346 cooperate to receive the feather seal 304 and to retain the feather seal 304 within the feather seal interfaces 350, 352. The feather seal 304 is typically rectangular in cross sectional area with generally a constant thickness of between about 0.003 inches to about 0.020 inches. In other embodiments, a varying cross sectional area and varying feather seal thickness may be employed to enhance sealing and minimize leakage across the feather seal 304.

In certain embodiments, the inner endwall segments 346 may also define one or more cooling regions, generally indicated by 380. The cooling region 380 may be defined through the inner endwall segments 346 proximate to the feather seal interface 352. The cooling region 380 may include at least one or a plurality of film cooling holes 282, which are defined through the inner endwall segments 346 to provide fluid communication between the plenum 258 (FIG. 9) and the airflow path 254. Generally, the film cooling holes 282 enable the cooler, higher pressure air from the plenum 258 (FIG. 9) to cool the inner endwall segments 346 and the adjacent nozzle vanes 224. This may improve an operating life of both the inner endwall segments 346 and the nozzle vanes 224. It should be noted that in certain embodiments, the outer endwall segments 344 may also include the cooling region 380.

As the turbine nozzle 300 may be composed of the same materials and formed using the same techniques to form the turbine nozzle 200, the composition of the turbine nozzle 300 and formation thereof will not be discussed in detail herein. Briefly, however, each of the nozzle segments 302 are integrally formed, monolithic or one-piece, and are composed of a metal or metal alloy, the same as those described with regard to the nozzle segments 202. The nozzle segments 302 and the feather seal interfaces 350, 352 may be manufactured by investment casting (using a ceramic core or fugitive core); formed using conventional dies with one or more portions of the core (or portions adjacent to the core) comprising a fugitive core insert; or formed using other additive manufacturing processes, including, but not limited to, direct metal laser sintering, binder jet printing, etc. The nozzle segments 302 may also be cast or formed with additive manufacturing, and the feather seal interfaces 350, 352 may be machined in the nozzle segments 302 via grinding, milling, wire electrical discharge machining (EDM), plunge EDM, electrochemical machining, etc. In other embodiments, the nozzle segments 302 may comprise monolithic ceramics such as silicon nitride or may comprise ceramic matrix composite (CMC) materials such as Ox-Ox or SiC—SiC.

With the nozzle segments 302 and the feather seals 304 formed, the feather seals 304 may be positioned within each of the feather seal slots 264 of the feather seal interfaces 350, 352. The nozzle segments 302 may be positioned in an annular array and coupled together via brazing, etc. In other embodiments, the nozzle segments 302 may be configured differently. For example, the nozzle segments 302 may be formed with one of the outer endwall segment 344 and the inner endwall segment 346 coupled to the nozzle vane 224. The other of the outer endwall or the inner endwall may be cast as a unitary ring, which is coupled to the nozzle segment 302 via brazing, bi-casting, etc. Thus, in certain embodiments, the nozzle segments 302 may define one of the feather seal interfaces 350, 352 via the endwall segments 344, 346 and the other of the outer endwall or inner endwall may comprise a unitary ring devoid of the respective one of the feather seal interfaces 350, 352. In one example, the nozzle segments 302 may include the inner endwall segments 346 that define the feather seal interfaces 352, and the outer endwall may comprise a unitary ring devoid of the feather seal interfaces 350, which is coupled to the nozzle vanes 224 via brazing, bi-casting, etc.

With the turbine nozzle 300 formed, the turbine nozzle 300 is installed into the gas turbine engine 100 (FIG. 1). In use, as the gas turbine engine 100 operates, the combustive gases flow from the combustion chamber 124 (FIG. 1) through the airflow path 254. The feather seal interfaces 350, 352 and the feather seals 304 cooperate to reduce leakage of the cooler, higher pressure fluid 257 from the plenum 258 (FIG. 4) into the airflow path 254. This reduces chargeable and non-chargeable leakage flow by up to 40%, which provides additional cooling fluid for the combustion chamber 124 and turbine section 108 (FIG. 1). Moreover, the placement of the feather seal interfaces 350, 352 along the area(s) of reduced pressure drop, the cooling region 380 may be defined through the inner endwall segments 346, which enables enhanced impingement cooling coverage of the inner endwall segments 346. This increases operating life of the inner endwall 322 and the nozzle vanes 224. Further, by moving the feather seal interfaces 350, 352 proximate the pressure side 240, tripping or interrupting of the cooling fluid through the film cooling holes 282 is reduced as there is no step in the airflow path 254. This allows a cooling film created by the film cooling holes 282 to stay attached to the inner endwall 322 longer, which lowers a heat load on a surface of the inner endwall segments 346. Further, the placement of the feather seal interfaces 350, 352 proximate the pressure side 240 also moves the feather seals 304 away from the combustive gases that flow through the airflow path 254. This reduces a heat load acting on the feather seals 304, which prolongs an operating life of the feather seals 304. In addition, by defining the feather seal interfaces 350, 352 proximate the pressure side 240, showerhead film holes may be defined in the nozzle vanes 224, if desired, which improves cooling of the nozzle vanes 224. In addition, in the example of the turbine nozzle 300 as a high pressure turbine nozzle, the placement of the feather seal interfaces 350, 352 improves specific fuel consumption for the gas turbine engine 100 (FIG. 1) by up to about 0.2%.

It should be noted that in other embodiments, the feather seal interfaces 250, 252 of the turbine nozzle 200 may be configured differently to receive the feather seal 204 to reduce leakage between adjacent nozzle segments 202. For example, with reference to FIG. 12, a turbine nozzle 400 is shown with feather seal interfaces 450, 452 for receiving a feather seal 404. As the turbine nozzle 400 includes components that are the same or similar to components of the turbine nozzle 200 discussed with regard to FIGS. 1-8, the same reference numerals will be used to denote the same or similar components.

Figure 12:
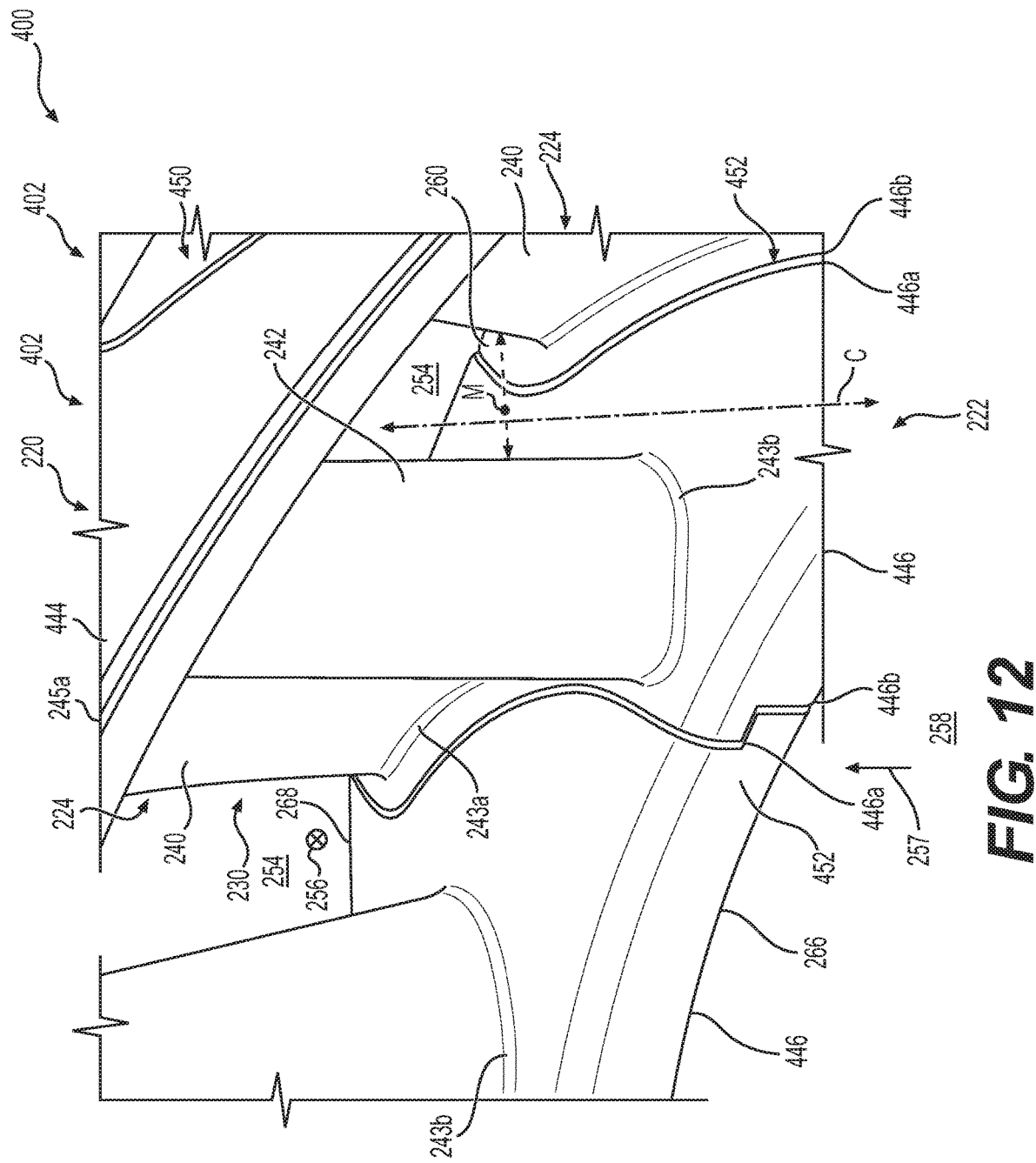
FIG. 12 is a perspective view of a portion of another exemplary turbine nozzle for use with the gas turbine engine of FIG. 1.

In FIG. 12, a portion the turbine nozzle 400 is shown. In one example, the turbine nozzle 400 is segmented or is not a monolithic or unitary ring, and includes the plurality of nozzle segments 402 that are assembled together to form a full-ring. Each of the nozzle segments 402 include an outer endwall segment 444, an inner endwall segment 446 and one or more of the nozzle vanes 224, which extend radially between the endwall segments 444, 446. The outer endwall segments 444, when assembled, form the outer annular endwall 220, and the inner endwall segments 446, when assembled, formed the inner annular endwall 222. Thus, the annular endwalls 220, 222, in this example, comprise segmented annular endwalls that are assembled into a ring. In one example, each of the nozzle segments 402 include a single one of the nozzle vanes 224, which extends between the respective endwall segments 444, 446; however, the nozzle segments 402 may include two nozzle vanes 224 (doublets), three nozzle vanes 224 (triplets), four nozzle vanes 224 (quadruplet), etc. It should be noted that while FIG. 12 depicts the turbine nozzle 400 with a plurality of singlet nozzle segments 402, the turbine nozzle 400 may be manufactured with combinations of singlets, doublets, triplets, quadruplets, etc.

In order to reduce leakage between adjacent the nozzle segments 402, at least one of the feather seals 404 (FIG. 14) is coupled between the adjacent nozzle segments 402. Generally, in order to reduce leakage about the turbine nozzle 400, at least one of the feather seals 404 is coupled between each adjacent nozzle segment 402. In one example, the adjacent nozzle segments 402 cooperate to define the plurality of feather seal interfaces 450, 452 that receives the feather seal 404. In FIG. 12, one of the feather seal interfaces 450 defined in respective portions of adjacent outer endwall segments 444 and one of the feather seal interfaces 452 defined in respective portions of adjacent inner endwall segments 446 is shown. In the example of FIG. 12, the feather seal interface 450 is defined in respective portions of the outer endwall segments 444 between the adjacent nozzle segments 402, and the feather seal interface 452 is defined in respective portions of the inner endwall segments 446 between the adjacent nozzle segments 402. The feather seal interface 450 is defined through the outer endwall segments 444 so as to be positioned proximate the pressure side 240 of the nozzle vane 224, and the feather seal interface 452 is defined through the inner endwall segments 446 so as to be positioned proximate the pressure side 240 of the nozzle vane 224. By positioning the feather seal interfaces 450, 452 proximate the pressure side surface 240, leakage through the feather seal interfaces 450, 452, and thus, the feather seals 404 is reduced.

In this regard, as discussed, with reference to FIG. 12, the airflow path 254 is defined between airfoils 230 of adjacent nozzle vanes 224 and the airflow path 254 is part of and in communication with the flow path 212 to receive the combustive gas flow. The high pressure combustive gas flow 256 from the combustion chamber 124 (FIG. 1) flows through the airflow path 254, and the cooler, higher pressure fluid 257 from the plenum 258 is present beneath the inner endwall segments 446 and above the outer endwall segments 444. Based on a determination of the pressure field, using computational fluid analysis, as discussed, one or more areas of reduced pressure drop may be determined. The feather seal interfaces 450, 452 are defined within the endwall segments 444, 446 so as to be positioned within the airflow path 254 along a line that interconnects the area(s) of reduced pressure drop. In this example, the feather seal interfaces 450, 452 are defined through the endwall segments 444, 446 proximate the pressure side 240 so as to be defined directly adjacent to the fillets 243a, 245a along a curved line that follows the area(s) of reduced pressure drop.

Stated another way, the throat 260 is defined within the airflow path 254. The feather seal interfaces 450, 452 are defined within the airflow path 254 so as to be offset from the midpoint M of the throat 260 toward the pressure side 240. The airflow path 254 has the centerline C. Each of the feather seal interfaces 450, 452 are also defined within the airflow path 254 so as to be offset from the centerline C toward the pressure side 240 along a line that interconnects the lowest pressure drop in the pressure field defined between the adjacent nozzle vanes 224.

Figure 13:
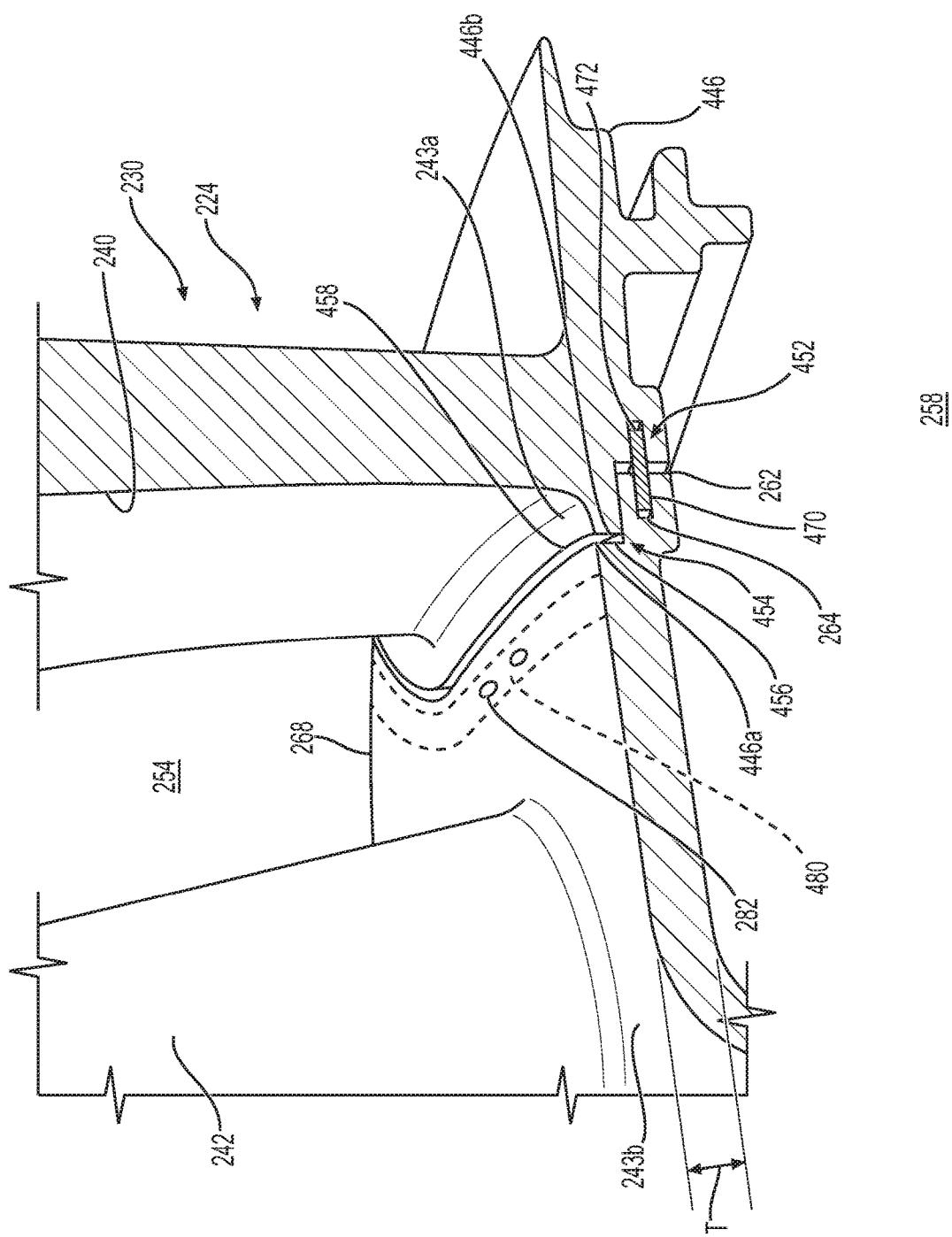
FIG. 13 is a cross-sectional view of the turbine nozzle of FIG. 12, taken parallel to the page.

It should be understood that as each of the feather seal interfaces 450, 452 is the same, in the interest of brevity, a single one of the feather seal interfaces 450 will be described in detail herein with the understanding that the remainder of the feather seal interfaces 450, 452 of the turbine nozzle 400 is the same. In this example, the feather seal interface 450 is curved to follow along the fillet 243a proximate the pressure side 240 of the airfoil 230. With reference to FIG. 13, the feather seal interface 450 is defined to have a generally cross-shape, however, the feather seal interfaces 450, 452 may have a different shape. In this example, the feather seal interface 450 is defined by the gap 262 that intersects the feather seal slot 264 and the feather seal interface 450 includes an overlap 454. Generally, the gap 262 is defined by and between the adjacent endwall segments 444, 446. The gap 262 is defined in the radial direction, and extends between the endwall segment 446. Generally, the gap 262 is defined by terminal ends 446a, 446b of the adjacent endwall segments 446. Each of the endwall segments 446 includes one of the terminal ends 446a opposite the other terminal end 446b (FIG. 12). The feather seal slot 264 is defined through a portion of the thickness T of the endwall segment 446, and extends from the first side 266 of the endwall segment 446 (FIG. 12) to the opposite, second side 268 of the endwall segment 446. The feather seal slot 264 is defined in each of the endwall segments 446 to receive a portion of the feather seal 404.

The overlap 454 includes a channel 456 and a lip 458. The channel 456 is defined axially from the first side 266 (FIG. 12) to the second side 268 of the respective endwall segment 446 along the terminal end 446a. In this example, the channel 456 is a relief, which is sized to receive the lip 458 such that the lip 458 overlaps or extends over both the gap 262 and the feather seal slot 264. The lip 458 is defined axially from the first side 266 (FIG. 12) to the second side 268 of the respective endwall segment 446 along the terminal end 446b so as to be proximate the fillet 243a and the pressure side 240. The lip 458 extends outwardly from the fillet 243a, and is sized to cover both the gap 262 and the feather seal slot 264. As the lip 458 overlaps the gap 262 and the feather seal slot 264, the leakage through the feather seal interfaces 450 may be reduced as the overlap 454 creates a tortuous path for the fluid to exit into the airflow path 254. Moreover, the lip 458 enables the gap 262 and the feather seal slot 264 to be configured differently. In this regard, as the overlap 454 is defined along the pressure field in the area(s) of reduced pressure drop, the gap 262 and/or the feather seal slot 264 may have a different configuration, such as straight, etc., while still providing reduced leakage through the feather seal interfaces 450, 452 (FIG. 12). Thus, the overlap 454 provides reduced leakage through the feather seal interfaces 450, 452. In addition, by providing the overlap 454 in the feather seal interfaces 450, 452 (FIG. 12), the gas in the airflow path 254 may be at higher temperatures due to the feather seal 404 being protected from the hot gas because of the overlap 454. Overall, the endwall segments 444, 446 and the airfoil 230 (of the nozzle vane 224) effectiveness may also be greatly increased because of accessibility of the leading edge 236 (FIG. 3) and the pressure side 240 of the airfoil 230, in addition to providing space for an uninterrupted impingement scheme on the endwall segments 444, 446.

Figure 14:
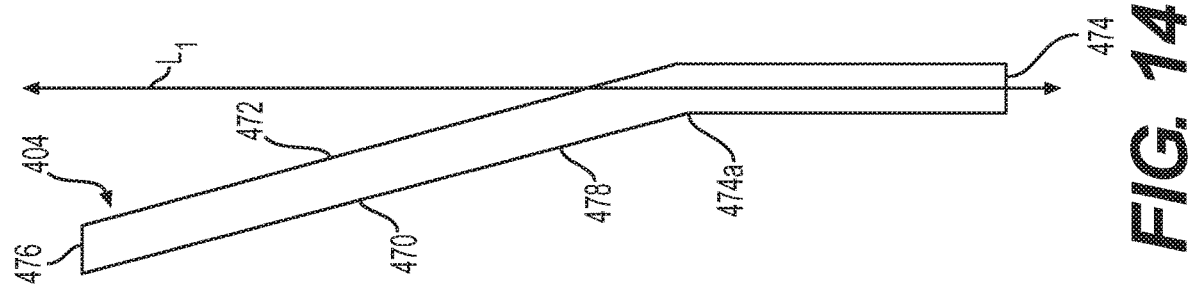
FIG. 14 is a top view of an exemplary feather seal that is received within the feather seal slots of the feather seal interfaces associated with the turbine nozzle of FIG. 12 in accordance with various embodiments.

With reference to FIG. 14, a top view of the feather seal 404 is shown. As shown in FIG. 14, the feather seal 404 includes a first seal side 470 opposite a second seal side 472, and a first seal end 474 opposite a second seal end 476. The feather seal 404 is composed of a metal, including, but not limited to cobalt or nickel based alloys; and may be cast, molded, punched, etc. In this example, the feather seal 404 is shaped to follow the feather seal interfaces 450, 452. The first seal end 474 of the feather seal 304 is offset from the second seal end 476 relative to a seal longitudinal axis L1. The first seal end 474 includes a bend 474a. A body portion 478 interconnects the bend 474a with the second seal end 476, and the body portion 478 is substantially straight. The bend 474a enables the feather seal 404 to follow the curvature of the feather seal interfaces 450, 452 proximate the pressure side 240 of the airfoil 230 (FIG. 13). With reference to FIG. 13, the first seal side 470 is coupled to or received within the feather seal slot 264 of one of the endwall segments 446 and the second seal side 472 is coupled to or received within the feather seal slot 264 of the adjacent other one of the endwall segments 446. Thus, the feather seal slots 264 of the adjacent endwall segments 444 (FIG. 12), 446 cooperate to receive the feather seal 404, and the lip 458 is positioned over the feather seal 404 and overlaps the feather seal 404. The feather seal 404 is typically rectangular in cross sectional area with generally a constant thickness of between about 0.003 inches to about 0.020 inches. In other embodiments, a varying cross sectional area and varying feather seal thickness may be employed to enhance sealing and minimize leakage across the feather seal 404.

Figure 15:
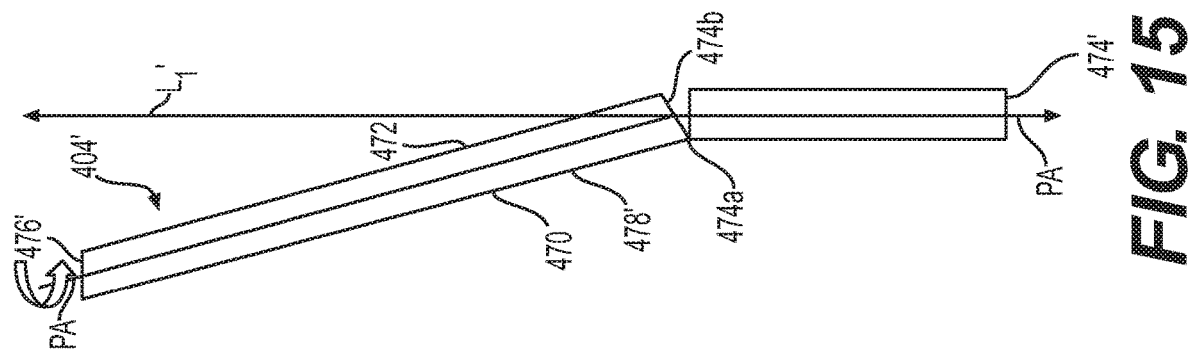
FIG. 15 is a top view of another exemplary feather seal that is received within the feather seal slots of the feather seal interfaces associated with the turbine nozzle of FIG. 12 in accordance with various embodiments.

It should be noted that in other embodiments, the feather seal 404 may have a different shape. For example, with reference to FIG. 15, a feather seal 404' is shown. The feather seal 404' includes a first seal side 470' opposite a second seal side 472', and a first seal end 474' opposite a second seal end 476'. The feather seal 404' is composed of a metal, including, but not limited to cobalt or nickel based alloys; and may be cast, molded, punched, etc. In this example, the first seal end 474' of the feather seal 404' is offset from the second seal end 476' relative to a seal longitudinal axis L1'. The first seal end 474' of the feather seal 404' is offset from the second seal end 476' relative to a seal longitudinal axis L1'. The first seal end 474' includes the bend 474a and a cut-out or notch 474b. A body portion 478' interconnects the bend 474a with the second seal end 476'. The body portion 478' is substantially straight and extends from the notch 474b to the second seal end 476'. The bend 474a enables the feather seal 404' to follow the curvature of the feather seal interfaces 450, 452 proximate the pressure side 240 of the airfoil 230 (FIG. 13), and the notch 474b enables the feather seal 404' to pivot about a pivot axis PA defined through the feather seal 404'. By providing the notch 474b, the feather seal 404' may move or rotate during the operation of the gas turbine engine 100 (FIG. 1), which enables the feather seal 404' to better seal in the gas turbine engine 100 (FIG. 1), including accommodating slight movements of the turbine nozzle 400 (FIG. 12). With reference to FIG. 13, the first seal side 470' is coupled to or received within the feather seal slot 264 of one of the endwall segments 444 (FIG. 12), 446 and the second seal side 472' is coupled to or received within the feather seal slot 264 of the adjacent other one of the endwall segments 444, 446. Thus, the feather seal slots 264 of the adjacent endwall segments 444, 446 cooperate to receive the feather seal 404', and the lip 458 is positioned over the feather seal 404' and overlaps the feather seal 404'. The feather seal 404' is typically rectangular in cross sectional area with generally a constant thickness of between about 0.003 inches to about 0.020 inches. In other embodiments, a varying cross sectional area and varying feather seal thickness may be employed to enhance sealing and minimize leakage across the feather seal 404'.

In certain embodiments, with reference to FIG. 13, the inner endwall segments 446 may also define one or more cooling regions, generally indicated by 480. The cooling region 480 may be defined through the inner endwall segments 446 proximate to the feather seal interface 452. The cooling region 480 may include the at least one or the plurality of film cooling holes 282, which are defined through the inner endwall segments 446 to provide fluid communication between the plenum 258 (FIG. 12) and the airflow path 254. Generally, the film cooling holes 282 enable the cooler, high pressure air from the plenum 258 to cool the inner endwall segments 446 and the adjacent nozzle vanes 224. This may improve an operating life of both the inner endwall segments 464 and the nozzle vanes 224. It should be noted that in certain embodiments, the outer endwall segments 444 may also include the cooling region 480.

As the turbine nozzle 400 may be composed of the same materials and formed using the same techniques to form the turbine nozzle 200, the composition of the turbine nozzle 400 and formation thereof will not be discussed in detail herein. Briefly, however, each of the nozzle segments 402 are integrally formed, monolithic or one-piece, and are composed of a metal or metal alloy, the same as those described with regard to the nozzle segments 202. The nozzle segments 402 and the feather seal interfaces 450, 452 may be manufactured by investment casting (using a ceramic core or fugitive core); formed using conventional dies with one or more portions of the core (or portions adjacent to the core) comprising a fugitive core insert; or formed using other additive manufacturing processes, including, but not limited to, direct metal laser sintering, binder jet printing, etc. The nozzle segments 402 may also be cast or formed with additive manufacturing, and the feather seal interfaces 450, 452 may be machined in the nozzle segments 402 via grinding, milling, wire electrical discharge machining (EDM), plunge EDM, electrochemical machining, etc.

With the nozzle segments 402 and the feather seals 404 or 404' formed, the feather seals 404 or 404' may be positioned within each of the feather seal slots 264 of the feather seal interfaces 450, 452. The nozzle segments 402 may be positioned in an annular array and coupled together via brazing, etc. In other embodiments, the nozzle segments 402 may be configured differently. For example, the nozzle segments 402 may be formed with one of the outer endwall segment 444 and the inner endwall segment 446 coupled to the nozzle vane 224. The other of the outer endwall or the inner endwall may be cast as a unitary ring, which is coupled to the nozzle segment 402 via brazing, bi-casting, etc. Thus, in certain embodiments, the nozzle segments 402 may define one of the feather seal interfaces 450, 452 via the endwall segments 444, 446 and the other of the outer endwall or inner endwall may comprise a unitary ring devoid of the respective one of the feather seal interfaces 450, 452. In one example, the nozzle segments 402 may include the inner endwall segments 446 that define the feather seal interfaces 452, and the outer endwall may comprise a unitary ring devoid of the feather seal interfaces 450, which is coupled to the nozzle vanes 224 via brazing, bi-casting, etc.

With the turbine nozzle 400 formed, the turbine nozzle 400 is installed into the gas turbine engine 100 (FIG. 1). In use, as the gas turbine engine 100 operates, the combustive gases flow from the combustion chamber 124 (FIG. 1) through the airflow path 254. The feather seal interfaces 450, 452 and the feather seals 404 or 404' cooperate to reduce leakage of the cooler, higher pressure fluid 257 from the plenum 258 (FIG. 4) into the airflow path 254. This reduces chargeable and non-chargeable leakage flow by up to about 40%, which provides additional cooling fluid for the combustion chamber 124 and turbine section 108 (FIG. 1). Moreover, the placement of the feather seal interfaces 450, 452 along the area(s) of reduced pressure drop, the cooling region 480 may be defined through the inner endwall segments 446, which enables enhanced impingement cooling coverage of the inner endwall segments 446. This increases operating life of the inner endwall 422 and the nozzle vanes 224. Further, by moving the feather seal interfaces 450, 452 proximate the pressure side 240, tripping or interrupting of the cooling fluid through the film cooling holes 282 is reduced as there is no step in the airflow path 254. This allows a cooling film created by the film cooling holes 282 to stay attached to the inner endwall 422 longer, which lowers a heat load on a surface of the inner endwall segments 346. Further, the placement of the feather seal interfaces 450, 452 proximate the pressure side 240 along with the overlap 454 also moves the feather seals 404 or 404' away from the combustive gases that flow through the airflow path 254. This reduces a heat load acting on the feather seals 404 or 404', which prolongs an operating life of the feather seals 404 or 404'. In addition, by defining the feather seal interfaces 450, 452 proximate the pressure side 240, showerhead film holes may be defined in the nozzle vanes 224, if desired, which improves cooling of the nozzle vanes 224. In addition, in the example of the turbine nozzle 400 as a high pressure turbine nozzle, the placement of the feather seal interfaces 450, 452 improves specific fuel consumption for the gas turbine engine 100 (FIG. 1) by up to about 0.2%. It should be noted that the feather seal interfaces 450, 452 may also be shaped or configured to receive the feather seals 204, 204' or 304, if desired.

It should be noted that while the feather seal interfaces 250, 252; 350, 352; 450, 452 are described herein as being defined directly adjacent to the fillets 243a, 245a, it will be understood that the nozzle vane 224 need not include the fillets 243a, 245a. In these instances, the feather seal interfaces 250, 252; 350, 352; 450, 452 may be defined directly adjacent to the pressure side 240.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine nozzle for a gas turbine engine, comprising:
a plurality of nozzle segments that are configured to be assembled into a full ring such that each one of the plurality of nozzle segments is adjacent to another one of the plurality of nozzle segments, each one of the plurality of nozzle segments including an endwall segment and a nozzle vane;
a feather seal interface defined by endwall segments of adjacent ones of the plurality of nozzle segments, the feather seal interface defined along an area of reduced pressure drop through a pressure field defined between adjacent nozzle vanes of the plurality of nozzle segments; and
a feather seal received within the feather seal interface that cooperates with the feather seal interface to reduce leakage through the plurality of nozzle segments, the feather seal has a first seal end, a second seal end opposite the first seal end and a notch is defined through the feather seal between the first seal end and the second seal end such that the feather seal is pivotable about a pivot axis defined through the feather seal.

2. The turbine nozzle of claim 1, wherein the feather seal interface is defined proximate a pressure side of the one of the adjacent nozzle vanes to follow a curvature of the pressure side.

3. The turbine nozzle of claim 1, further comprising at least one cooling region defined through one of the endwall segments proximate the feather seal interface.

4. The turbine nozzle of claim 1, wherein a throat is defined between the adjacent nozzle vanes, and the feather seal interface is defined so as to be offset from a midpoint of the throat toward a pressure side of one of the adjacent nozzle vanes.

5. The turbine nozzle of claim 1, wherein a centerline is defined between the adjacent nozzle vanes, and the feather seal interface is defined so as to be at least partially offset from the centerline toward a pressure side of one of the adjacent nozzle vanes.

6. The turbine nozzle of claim 1, wherein the first seal end is offset from the second seal end relative to a seal longitudinal axis that extends through the feather seal.

7. The turbine nozzle of claim 1, wherein the feather seal interface includes an intersegmental gap defined between the endwall segments of the adjacent ones of the plurality of nozzle segments and a feather seal slot that intersects the intersegmental gap, with the feather seal received within the feather seal slot.

8. The turbine nozzle of claim 7, wherein the feather seal interface further comprises a lip that extends outwardly from a fillet to cover at least the feather seal slot, and a channel defined by the endwall of the one of the plurality of nozzle segments that receives the lip.

9. A turbine nozzle for a gas turbine engine, comprising:
a plurality of nozzle segments that are configured to be assembled into a full ring such that each one of the plurality of nozzle segments is adjacent to another one of the plurality of nozzle segments, each one of the plurality of nozzle segments including an inner endwall segment, an outer endwall segment and a nozzle vane that extends between the inner endwall segment and the outer endwall segment, each nozzle vane of the plurality of nozzle segments including a pressure side opposite a suction side and a fillet defined at an interface between the pressure side and the inner endwall segment;
a feather seal interface defined by inner endwall segments of adjacent ones of the plurality of nozzle segments, the feather seal interface defined proximate the pressure side of each nozzle vane of the plurality of nozzle segments and directly adjacent to the fillet; and
a feather seal received within the feather seal interface that cooperates with the feather seal interface to reduce leakage through the plurality of nozzle segments, the feather seal has a first seal end, a second seal end opposite the first seal end and a notch is defined through the feather seal between the first seal end and the second seal end such that the feather seal is pivotable about a pivot axis defined through the feather seal.

10. The turbine nozzle of claim 9, wherein the feather seal interface is defined proximate the pressure side of each nozzle vane of the plurality of nozzle segments to follow a curvature of the pressure side, and the feather seal interface includes an intersegmental gap defined between the inner endwall segments of the adjacent ones of the plurality of nozzle segments and a feather seal slot that intersects the gap, with the feather seal received within the feather seal slot.

11. The turbine nozzle of claim 9, wherein a centerline is defined between adjacent nozzle vanes of the plurality of nozzle segments, and the feather seal interface is defined so as to be at least partially offset from the centerline toward the pressure side.

12. The turbine nozzle of claim 9, wherein the first seal end is offset from the second seal end relative to a seal longitudinal axis that extends through the feather seal.

13. The turbine nozzle of claim 9, further comprising a second feather seal interface defined by outer endwall segments of adjacent ones of the plurality of nozzle segments, the second feather seal interface defined proximate the pressure side of each nozzle vane of the plurality of nozzle segments; and
a second feather seal received within the second feather seal interface that has a third seal end and an opposite fourth seal end, with the third seal end offset from the fourth seal end relative to a seal longitudinal axis that extends through the second feather seal.

14. The turbine nozzle of claim 13, wherein a centerline is defined between adjacent nozzle vanes of the plurality of nozzle segments, the second feather seal interface is defined so as to be at least partially offset from the centerline toward the pressure side, the second feather seal interface includes a second gap defined between the outer endwall segments of the adjacent ones of the plurality of nozzle segments and a second feather seal slot that intersects the second gap, and the second feather seal is received within the second feather seal slot.

* * * * *